US011635551B2

(12) United States Patent
Aschwanden

(10) Patent No.: US 11,635,551 B2
(45) Date of Patent: Apr. 25, 2023

(54) OPTICAL ZOOM DEVICE

(71) Applicant: OPTOTUNE CONSUMER AG, Dietikon (CH)

(72) Inventor: Manuel Aschwanden, Allenwinden (CH)

(73) Assignee: OPTOTUNE CONSUMER AG, Dietikon (CH)

( * ) Notice: Subject to any disclaimer, the term of this patent is extended or adjusted under 35 U.S.C. 154(b) by 361 days.

(21) Appl. No.: 16/636,650

(22) PCT Filed: Aug. 2, 2018

(86) PCT No.: PCT/EP2018/071085
§ 371 (c)(1),
(2) Date: Feb. 5, 2020

(87) PCT Pub. No.: WO2019/030129
PCT Pub. Date: Feb. 14, 2019

(65) Prior Publication Data
US 2021/0149087 A1    May 20, 2021

(30) Foreign Application Priority Data
Aug. 5, 2017  (EP) .................................. 17185039

(51) Int. Cl.
*G02B 3/14*    (2006.01)
*G02B 15/14*   (2006.01)
(Continued)

(52) U.S. Cl.
CPC ................. *G02B 3/14* (2013.01); *G02B 7/10* (2013.01); *G02B 15/142* (2019.08); *G02B 15/20* (2013.01);
(Continued)

(58) Field of Classification Search
CPC .......... G02B 3/14; G02B 15/142; G02B 7/10; G02B 15/20; H04N 5/2254
(Continued)

(56) References Cited

U.S. PATENT DOCUMENTS

2006/0061660 A1* 3/2006 Brackmann .......... H04N 5/2253
                                                    348/208.1
2007/0195424 A1* 8/2007 Ojala ................... G02B 27/646
                                                    359/666
(Continued)

FOREIGN PATENT DOCUMENTS

CN    101379418    3/2009
CN    102422185    4/2012
(Continued)

*Primary Examiner* — James R Greece
(74) *Attorney, Agent, or Firm* — JMB Davis Ben-David

(57) ABSTRACT

The invention relates to an optical zoom device (1) Optical zoom device (1), comprising a first lens assembly (2), and a second lens assembly (3) following the first lens assembly (2) in the direction of an optical axis (A) of the optical zoom device (1) so that light (L) can pass through the first lens assembly (2) and thereafter through the second lens assembly when travelling along the optical axis (A), wherein said lens assemblies each comprise a focus-adjustable lens (31, 32) as well as an electropermanent magnet (107, 207) or a shape memory alloy (120, 220) for actuating the respective lens (31, 32).

20 Claims, 16 Drawing Sheets

(51) Int. Cl.
*G02B 7/10* (2021.01)
*G02B 15/20* (2006.01)
*H04N 5/225* (2006.01)

(52) U.S. Cl.
CPC ... *H04N 5/2254* (2013.01); *G03B 2205/0069* (2013.01); *G03B 2205/0076* (2013.01)

(58) Field of Classification Search
USPC .......................................................... 359/666
See application file for complete search history.

(56) References Cited

U.S. PATENT DOCUMENTS

| | | | |
|---|---|---|---|
| 2010/0289359 A1* | 11/2010 | Knaian | H02K 41/06 |
| | | | 310/195 |
| 2012/0275031 A1 | 11/2012 | Kong et al. | |
| 2015/0138648 A1 | 5/2015 | Lee et al. | |
| 2016/0381294 A1* | 12/2016 | Ollila | H04N 5/2257 |
| | | | 348/208.11 |

FOREIGN PATENT DOCUMENTS

| | | | |
|---|---|---|---|
| CN | 105637403 | 6/2016 | |
| CN | 105723251 | 6/2016 | |
| JP | 2000147354 | 5/2000 | |
| JP | 2002130114 | 5/2002 | |
| JP | 2011112757 | 6/2011 | |
| JP | 2016525718 | 8/2016 | |
| JP | 2016528559 | 9/2016 | |
| WO | 2014118546 | 8/2014 | |
| WO | WO-2014118546 A1 * | 8/2014 | ............. G02B 15/00 |
| WO | 2015024136 | 2/2015 | |

* cited by examiner

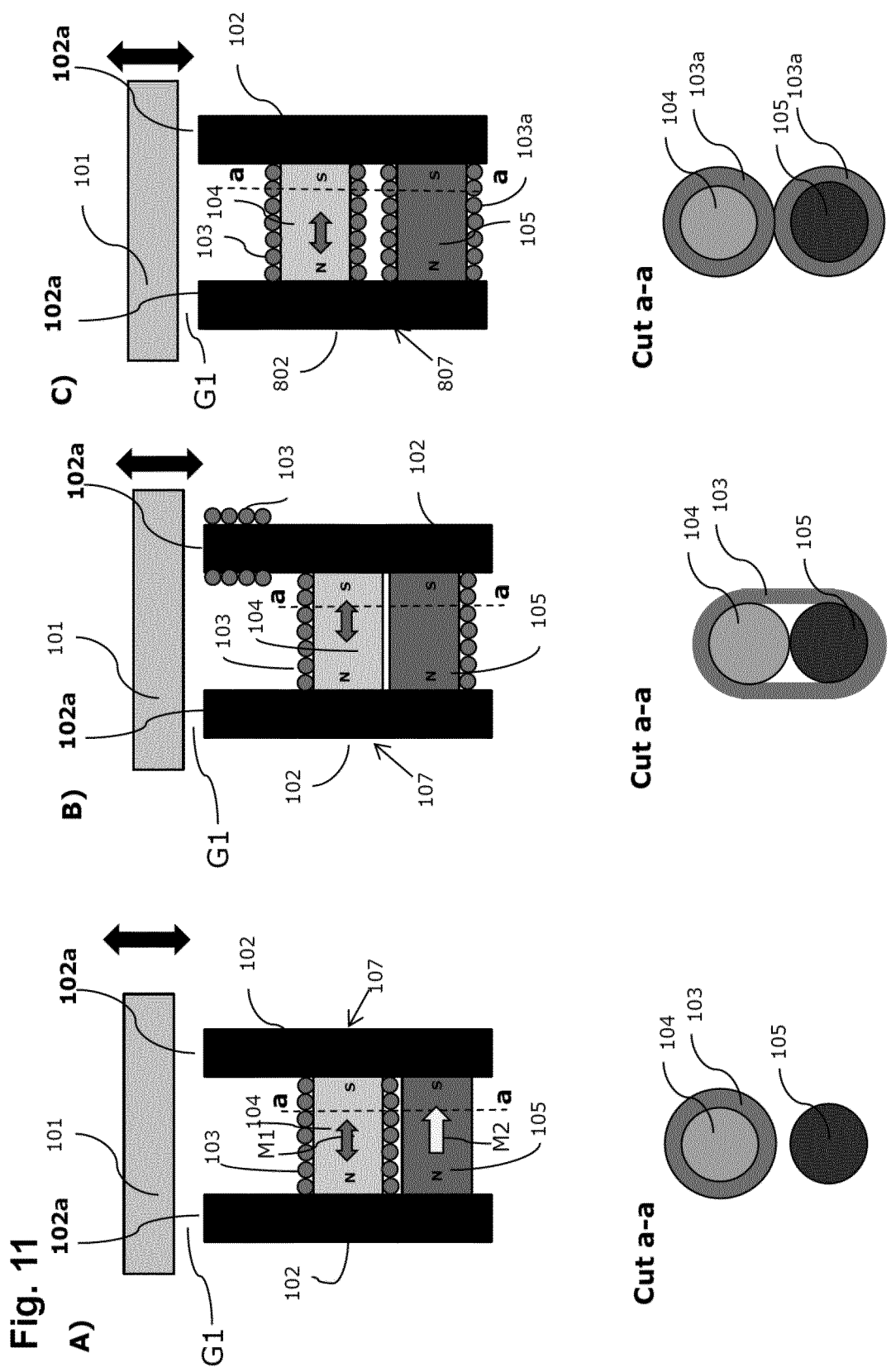

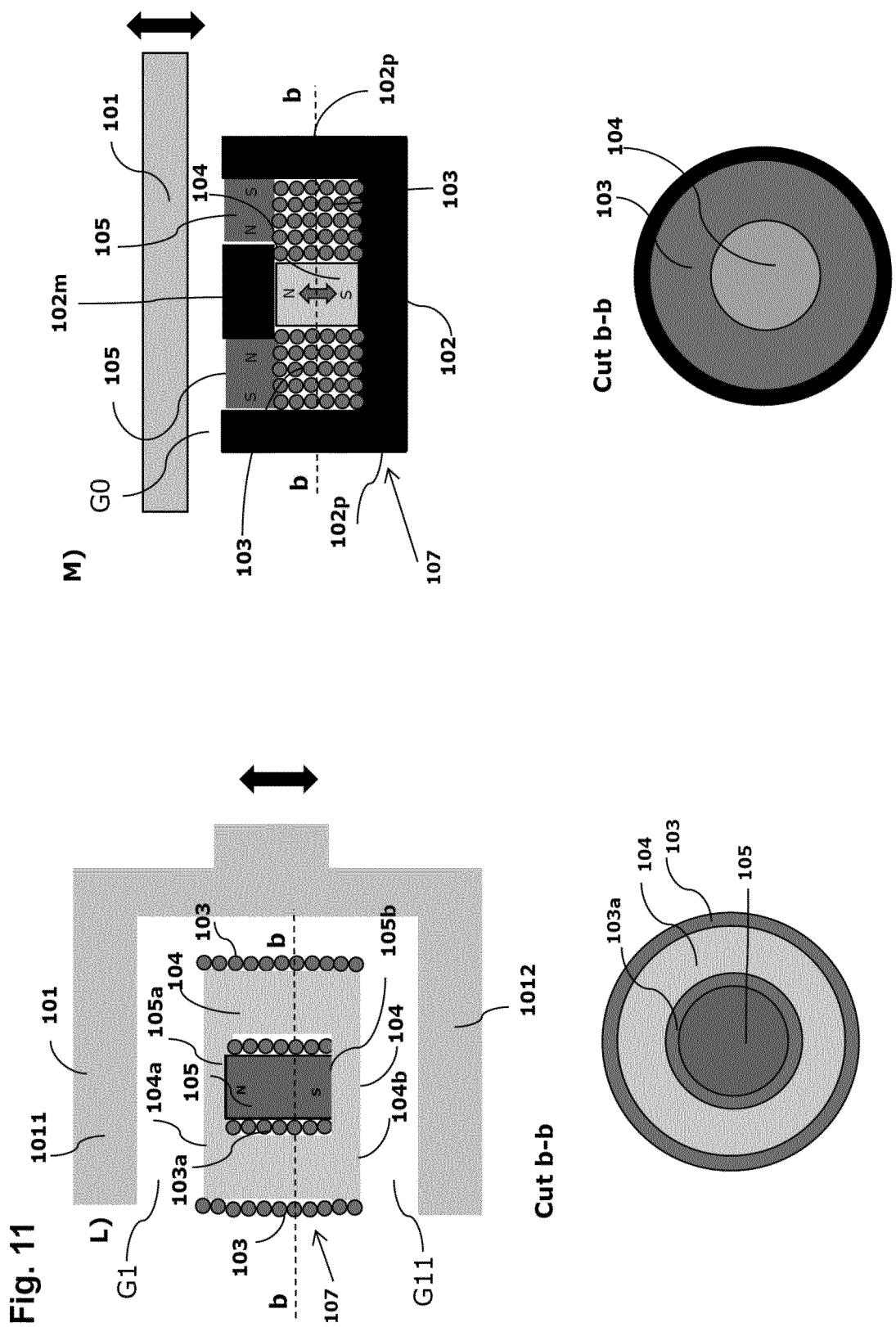

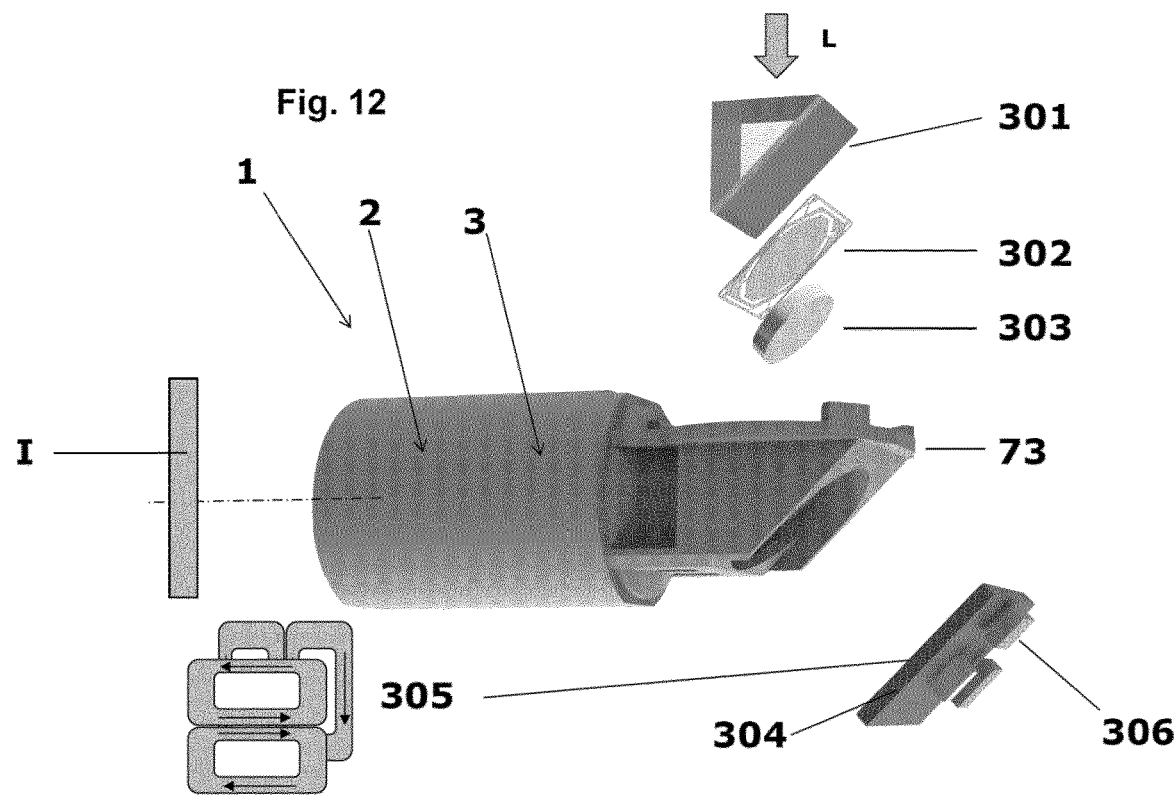
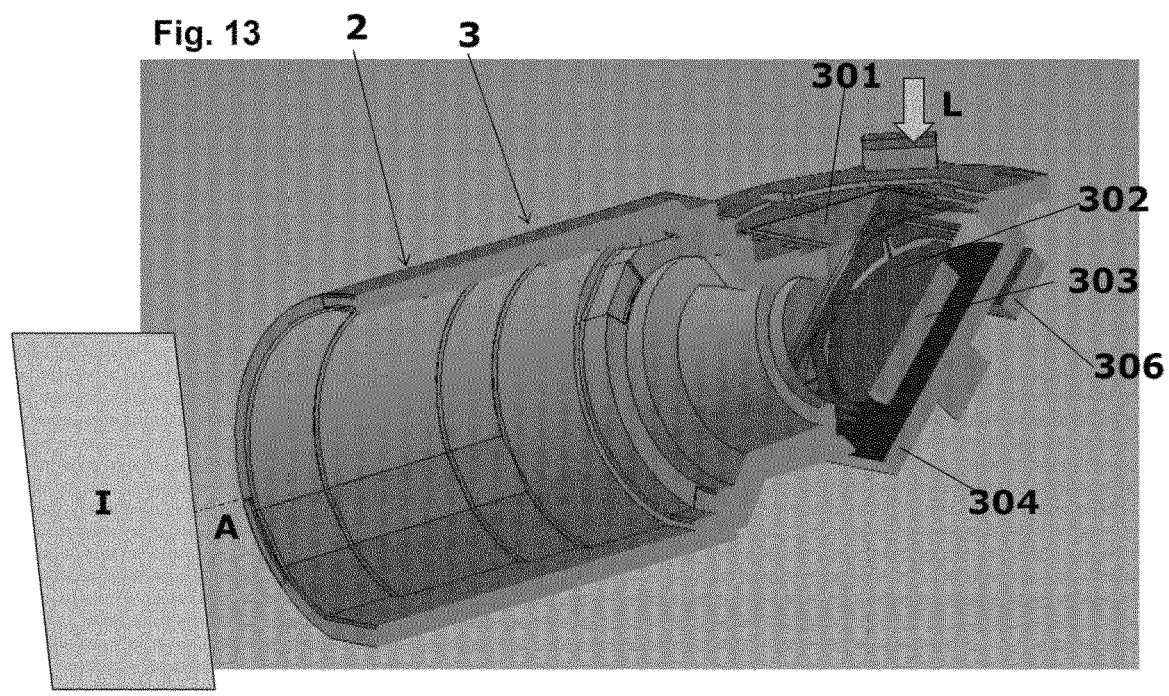

(D)

OPTICAL ZOOM DEVICE

CROSS-REFERENCE TO RELATED APPLICATIONS

This is the U.S. National Stage of International Patent Application No. PCT/EP2018/071085 filed on Aug. 2, 2018, which in turn claims the benefit of European Patent Application No. 17185039.9 filed on Aug. 5, 2017.

The present invention relates to an optical zoom device according to the preamble of claim 1.

Such optical zoom systems particularly comprise two basic characteristics, namely an adjustable focal length as well as a fixed image plane. Conventional optical zoom systems usually comprise several lens assemblies which can be displaced with respect to one another. Here, the focal length of the optical zoom system is continuously adjusted by said displacements of lens assemblies. Particularly, the individual lens assembly has to be displaced in a pre-defined manner so that complex mechanical/motorized systems are necessary for providing proper zooming.

Based on the above, the problem to be solved by the present invention is to provide an improved optical zoom device.

This problem is solved by an optical zoom device having the features of the claims herein.

Preferred embodiments of the present invention are stated in the respective sub claims and are described below.

According to claim 1 the optical zoom device comprises:
a first lens assembly, and
a second lens assembly following the first lens assembly, namely particularly in the direction of an optical axis of the optical zoom device so that light can pass the first lens assembly and thereafter the second lens assembly when travelling along the optical axis,
wherein, according to the invention the first lens assembly comprise a first rigid optical element and an adjacent first focus-adjustable lens, wherein the first focus-adjustable lens comprises a first container and a first reservoir, wherein the first container and the first reservoir are in flow connection and are filled with a transparent fluid, wherein the first container comprises a transparent and elastically expandable first membrane contacting the fluid, and wherein the first lens assembly further comprises a first actuator for pumping fluid from the first reservoir into the first container and from the first container into the first reservoir for adjusting a curvature of the first membrane and therewith a focal length of the first focus-adjustable lens, and wherein the first actuator comprises a first electropermanent magnet, and/or wherein
the second lens assembly comprise a second rigid optical element and an adjacent second focus-adjustable lens, wherein the second focus-adjustable lens comprises a second container and a second reservoir, wherein the second container and the second reservoir are in flow connection and are filled with a transparent fluid, wherein the second container comprises a transparent and elastically expandable second membrane contacting the fluid, and wherein the second lens assembly further comprises a second actuator for pumping fluid from the second reservoir into the second container and from the second container into the second reservoir for adjusting a curvature of the second membrane and therewith a focal length of the second focus-adjustable lens, and wherein the second actuator comprises a second electropermanent magnet.

Particularly, an electropermanent magnet in the sense of the present invention comprises at least a coil and a first magnet having a first coercivity, wherein the coil surrounds said first magnet.

In other words, the current invention describes a new approach to make liquid-membrane based optical zoom lenses. The key invention is related to the actuator mechanism which is using an electropermanent magnet as actuator for pumping fluid in and out of a lens container. Such an actuator is very compact and power efficient since it only needs power when switched to a zoom state and for a local autofocus sweep.

Such a system can also be combined with an optical image stabilization system which can use either an image sensor shifting mechanism or a prism tilt mechanism or a tunable prism or a lens shifting mechanism.

Particularly, according to an embodiment of the present invention, the first and the second rigid optical element comprise a fixed constant distance with respect to each other in the direction of the optical axis.

Furthermore, particularly, the first and/or second membrane can be made of at least one of the following materials: a glass, a polymer, an elastomer, a plastic or any other transparent and stretchable or flexible material. For example, the respective membrane may be made out of a silicone-based polymer such as poly(dimethylsiloxane) also known as PDMS or a polyester material such as PET or a biaxially-oriented polyethylene terephthalate (e.g. "Mylar"). Further, said fluid preferably is or comprises a liquid metal, a gel, a liquid, a gas, or any transparent, absorbing or reflecting material which can be deformed. For example, the fluid may be a silicone oil.

Furthermore, the first and the second rigid optical element are transparent according to an embodiment of the present invention.

Further, according to an embodiment of the present invention, the first and/or second rigid optical element is a rigid lens, particularly a biconvex lens. Particularly, rigid means that the lens/optical element is formed out of a material or several materials that is/are in a solid state in contrast to the fluid of the focus-adjustable lens. The respective rigid lens thus comprises a fixed focal length. Instead of a lens, the first and/or second rigid optical element can also be a flat transparent member (e.g. a flat glass or plastic member).

Furthermore, particularly, the respective rigid optical element can be formed out of a glass, a plastic, a polymer. The respective rigid optical element can comprise refractive, diffractive or reflective structures. Furthermore, the respective rigid optical element can comprise an antireflection coating.

Further, according to an embodiment of the present invention, the first rigid optical element forms a wall of the first container and faces the first membrane (e.g. in the direction of the optical axis of the optical zoom device. Further, according to an embodiment, the second rigid optical element forms a wall of the second container and faces the second membrane (e.g. in the direction of said optical axis).

Further, according to an embodiment of the present invention, the first membrane is connected to a circumferential first lens shaping element of the first lens assembly for defining a curvature-adjustable area of the first membrane, wherein the curvature-adjustable area of the first membrane comprises said curvature to be adjusted. Furthermore, according to an embodiment, the second membrane is connected to a circumferential second lens shaping element of the second lens assembly for defining a curvature-adjustable area of the second membrane, wherein the curvature-adjustable area of the second membrane comprises said curvature to be adjusted. The respective lens shaping element can be a circular member. Since the respective membrane is connected to the lens shaping element, the latter defines the respective curvature-adjustable area of the membrane and therewith the possible shape of the respective focus-adjustable lens.

When fluid is transferred from the respective reservoir into the container of the respective focus-adjustable lens, the elastically deformable membrane, namely the respective curvature-adjustable area bulges further out and produce e.g. a more pronounced convex curvature, which can be reduced by transferring fluid from the respective container into the respective reservoir. This allows one to reduce/transform the convex curvature to a concave curvature. Thus by pumping fluid in and out of the respective container, the curvature of the respective curvature-adjustable area can be adjusted and therewith the focal length of the respective focus-adjustable lens.

Further, according to an embodiment of the present invention, the optical zoom device comprises a holder (e.g. a lens barrel) having circumferential wall comprising an inner surface, wherein the first lens shaping element and the first rigid optical element are connected to the inner surface. Furthermore, according to an embodiment, the second lens shaping element and the second rigid optical element can also be connected to the inner surface. Furthermore, the electropermanent magnets of the actuators are preferably connected (e.g. mounted) to the holder.

Further, according to an embodiment of the present invention, the first and/or the second reservoir are arranged laterally of the holder (e.g. laterally of the wall of the holder, particularly on an outside of the wall of the holder).

Furthermore, according to an embodiment of the present invention, the flow connection between the first reservoir and the first container comprises a first opening of said wall of the holder. According to a further embodiment, also the flow connection between the second reservoir and the second container can comprise a second opening of said wall of the holder. Thus fluid is particularly pumped in and out of the respective container in a direction perpendicular to the optical axis.

Further, according to an embodiment of the present invention, for pumping fluid into and out of the first container the first reservoir comprises an elastically deformable wall. Further, according to an embodiment, the second reservoir may also comprise an elastically deformable wall for pumping said fluid into and out of the second container.

In order to move/deform the elastically deformable wall of the first reservoir, the first actuator is configured to act on a first member that is connected to the elastically deformable wall of the first reservoir, wherein the first actuator is configured to move the first member between a first and a second position via an intermediary position, wherein when the first member is moved to the first position, the elastically deformable wall of the first reservoir is deformed and a volume of the first reservoir is decreased, wherein fluid is pumped from the first reservoir via the flow connection into the first container, and wherein when the first member is moved to the second position the elastically deformable wall of the first reservoir is deformed and the volume of the first reservoir is increased and fluid is pumped from the first container via the flow connection into the first reservoir, wherein when the first member is in the first position the curvature-adjustable area of the first membrane comprises a convex curvature, wherein when the first member is in the intermediary position, the curvature-adjustable area of the first membrane comprises a convex radius of curvature that is larger than said convex radius of curvature associated to the first position, and wherein when the first member is in the second position the curvature-adjustable area of the first membrane can be flat or even have a concave curvature.

Likewise, according to an embodiment, for deforming/moving the elastically deformable wall of the second reservoir, the second actuator is configured to act on a second member that is connected to the elastically deformable wall of the second reservoir, wherein the second actuator is configured to move the second member between a first and a second position via an intermediary position, wherein when the second member is moved to the first position, the elastically deformable wall of the second reservoir is deformed and a volume of the second reservoir is decreased, wherein fluid is pumped from the second reservoir via the flow connection into the second container, and wherein when the second member is moved to the second position the elastically deformable wall of the second reservoir is deformed and the volume of the second reservoir is increased and fluid is pumped from the second container via the flow connection into the second reservoir, wherein when the second member is in the first position the curvature-adjustable area of the second membrane comprises a convex curvature, wherein when the second member is in the intermediary position the curvature-adjustable area of the second membrane comprises a convex radius of curvature that is larger than said convex radius of curvature associated to the first position, and wherein when the second member is in the second position the curvature-adjustable area of the second membrane can be flat or even have a concave curvature.

Furthermore, according to an embodiment, the optical zoom device is configured to measure the position of the first or second member using one of the following sensors: a Hall sensor, an inductive sensor, an optical sensor, an electrostatic sensor, a strain sensor.

Furthermore, according to an embodiment of the present invention, the first electropermanent magnet comprises a first magnet (e.g. a semi-hard magnet) and a coil, wherein the coil of the first electropermanent magnet comprises an electrically conducting conductor wound around a coil axis of the coil of the first electropermanent magnet, and wherein the coil of the first electropermanent magnet extends around the first magnet of the first electropermanent magnet, and wherein the first magnet of the first electropermanent magnet comprises a first coercivity.

Furthermore, according to an embodiment, also the second electropermanent magnet comprises a first magnet (e.g. a semi-hard magnet) and a coil, wherein the coil of the second electropermanent magnet comprises an electrically conducting conductor wound around a coil axis of the coil of the second electropermanent magnet, and wherein the coil of the second electropermanent magnet extends around the first magnet of the second electropermanent magnet, and wherein the first magnet of the second electropermanent magnet comprises a first coercivity.

Further, according to an embodiment of the present invention, the first member is a permanent magnet (e.g. a hard magnet) comprising a magnetization which extends parallel to the coil axis of the coil of the first electropermanent magnet. Likewise, according to an embodiment, also the second member is a permanent magnet (e.g. a hard magnet) comprising a magnetization which extends parallel to the coil axis of the coil of the second electropermanent magnet.

Particularly, a permanent magnet is an object made from a material that is magnetized and generates its own persistent magnetic field. Particularly, permanent magnets can be made from hard magnetic (e.g. ferromagnetic) materials such as alnico and ferrite which are hard to demagnetize. The composition of alnico alloys is typically 8% to 12% Al, 15% to 26% Ni, 5% to 24% Co, up to 6% Cu, up to 1% Ti, and the balance is Fe. Furthermore, some alloys of rare-earth metals can be used for permanent magnets. Particularly, magnetically hard materials tend to stay magnetized, in contrast to magnetically soft ferromagnetic materials like annealed iron, which can be magnetized but do not tend to stay magnetized.

Furthermore, according to an embodiment of the present invention, the coil axis of the coil of the first electropermanent magnet and/or the magnetization of the first member (e.g. permanent magnet) extend perpendicular to the elastically deformable wall of the first reservoir and/or perpendicular to the optical axis of the optical zoom device. Furthermore, also the coil axis of the coil of the second electropermanent magnet and/or the magnetization of the second member (e.g. permanent magnet) can extend perpendicular to the elastically deformable wall of the second reservoir and/or perpendicular to the optical axis of the optical zoom device according to an embodiment of the present invention.

According to yet another embodiment of the present invention, the optical zoom device allows a coarse tuning of its zoom factor.

For this, according to an embodiment, the optical zoom device is configured to apply an electrical current pulse to the coil of the first electropermanent magnet in order to magnetize the first magnet of the first electropermanent magnet so that a magnetization of the first magnet of the first electropermanent magnet points in the opposite direction or in the same direction as the magnetization of the first member, or so as to demagnetize the first magnet of the first electropermanent magnet so that the magnetization of the first magnet of the first electropermanent magnet essentially vanishes, wherein when the first magnet of the first electropermanent magnet is demagnetized, the first member is moved to the intermediary position, and wherein when the first magnet of the first electropermanent magnet is magnetized so that its magnetization points in the opposite direction as the magnetization of the first member, the first member is moved to the first position, and wherein when the first magnet of the first electropermanent magnet is magnetized so that its magnetization points in the same direction as the magnetization of the first member, the first member is moved to the second position.

Furthermore, coarse tuning of the zoom function also applies to the second lens assembly. For this, in an embodiment, the optical zoom device is configured to apply an electrical current pulse to the coil of the second electropermanent magnet in order to magnetize the first magnet of the second electropermanent magnet so that a magnetization of the first magnet of the second electropermanent magnet points in the opposite direction or in the same direction as the magnetization of the second member, or so as to demagnetize the first magnet of the second electropermanent magnet so that the magnetization of the first magnet of the second electropermanent magnet essentially vanishes, wherein when the first magnet of the second electropermanent magnet is demagnetized, the second member is moved to the intermediary position, and wherein when the first magnet of the second electropermanent magnet is magnetized so that its magnetization points in the opposite direction as the magnetization of the second member, the second member is moved to the first position, and wherein when the first magnet of the second electropermanent magnet is magnetized so that its magnetization points in the same direction as the magnetization of the second member, the second member is moved to the second position.

According to a further embodiment, this coarse tuning can be supplemented by a fine tuning of the focal length of the system.

For this, according to an embodiment, the optical zoom is configured to apply a constant electrical current to the coil of the first electropermanent magnet when the first member is in the first position or in the second position or in the intermediary position so that the coil of the first electropermanent magnet generates a magnetic field that interacts (e.g. Lorentz force) with a magnetic field of said first member so that the first member is moved out of its respective position, whereby the curvature of the curvature-adjustable area of the first membrane is fine tuned.

Furthermore, according to an embodiment, the optical zoom is configured to also apply a constant electrical current to the coil of the second electropermanent magnet when the second member is in the first position or in the second position or in the intermediary position so that the coil of the second electropermanent magnet generates a magnetic field that interacts (e.g. Lorentz force) with a magnetic field of said second member so that the second member is moved out of its respective position, whereby the curvature of the curvature-adjustable area of the second membrane is fine tuned.

Furthermore, according to an embodiment of the present invention, the first member is coupled to the first electropermanent magnet via a first spring structure. Further, likewise, according to an embodiment, the second member is coupled to the second electropermanent magnet via a second spring structure. These spring structures are preferably used with the electropermanent magnets described below.

According to an alternative embodiment of the optical zoom device according to the present invention, the electropermanent magnets of the two lens assemblies comprise not only a first magnet that can be magnetized and demagnetized, but also a second magnet (e.g. a hard magnet) that is permanently magnetized in one direction. Here, the coil of the first electropermanent magnet also extends around the second magnet of the first electropermanent magnet, wherein the second magnet of the first electropermanent magnet comprises a second coercivity that is larger than the first coercivity of the first magnet of the first electropermanent magnet.

Furthermore, according to an embodiment, also the second electropermanent magnet further comprises a second magnet (e.g. a hard magnet), wherein the coil of the second electropermanent magnet also extends around the second magnet of the second electropermanent magnet, and wherein the second magnet of the second electropermanent magnet comprises a second coercivity that is larger than the first coercivity of the first magnet of the second electropermanent magnet.

Furthermore, according to an embodiment, when the first electropermanent magnet comprises two magnets as described above, the first member is a magnetic flux guiding member (e.g. out of a magnetically soft material/metal), which forms a gap with a magnetic flux guiding structure of the first electropermanent magnet, which magnetic flux guiding structure is connected to the first and the second magnet of the first electropermanent magnet, and wherein the first member is coupled to the first electropermanent magnet via a first spring structure.

Further, according to an embodiment (when the second electropermanent magnet comprises two magnets as described above), also the second member is a magnetic flux guiding member (e.g. out of a magnetically soft material/metal), which forms a gap with a magnetic flux guiding structure of the second electropermanent magnet, which magnetic flux guiding structure is connected to the first and the second magnet of the second electropermanent magnet, and wherein the second member is coupled to the second electropermanent magnet via a second spring structure.

Particularly, here, according to an embodiment, the coil axis of the coil of the first electropermanent magnet extends parallel to said first member and/or parallel to the optical axis of the optical zoom device. Likewise, particularly, the coil axis of the coil of the second electropermanent magnet can also extend parallel to said second member and/or parallel to the optical axis of the optical zoom device.

Further, according to an embodiment of the optical zoom device according to the present invention, the magnetic flux guiding structure of the first electropermanent magnet comprises two spaced apart elements between which said first magnet and said second magnet of the first electropermanent magnet are arranged, such that the first and the second magnet of the first electropermanent magnet contact both elements of the magnetic flux guiding structure of the first electropermanent magnet or are connected in a magnetic flux guiding manner to both elements, wherein each element comprises a face side facing the first member, which face sides form the gap with the first member (magnetic flux guiding member). Particularly said two elements face each other in the direction of the coil axis of the coil of the first electropermanent magnet.

Likewise, according to an embodiment of the optical device, the magnetic flux guiding structure of the second electropermanent magnet comprises two spaced apart elements between which said first magnet and said second magnet of the second electropermanent magnet are arranged, such that the first and the second magnet of the second electropermanent magnet contact both elements of the magnetic flux guiding structure of the second electropermanent magnet or are connected in a magnetic flux guiding manner to both elements, wherein each element comprises a face side facing the second member, which face sides form the gap with the second member (magnetic flux guiding member). Particularly, said two elements face each other in the direction of the coil axis of the coil of the second electropermanent magnet.

Also in the embodiment of the optical zoom device comprising two magnets per electropermanent magnet, a coarse tuning of the zoom function is preferably provided.

For this, the optical zoom device is in turn configured to apply an electrical current pulse to the coil of the first electropermanent magnet in order to magnetize the first magnet of the first electropermanent magnet so that a magnetization of the first magnet of the first electropermanent magnet points in the opposite direction or in the same direction as the magnetization of the second magnet of the first electropermanent magnet, or so as to demagnetize the first magnet of the first electropermanent magnet so that the magnetization of the first magnet of the first electropermanent magnet essentially vanishes, wherein when the first magnet of the first electropermanent magnet is demagnetized, the first member is moved to the intermediary position against a counter force exerted by the first spring structure on the first member, and wherein when the first magnet of the first electropermanent magnet is magnetized so that its magnetization points in the opposite direction as the magnetization of the second magnet of the first electropermanent magnet, the first member is moved to the first position in the direction of a force exerted by the first spring structure on the first member, and wherein when the first magnet of the first electropermanent magnet is magnetized so that its magnetization points in the same direction as the magnetization of the second magnet of the first electropermanent magnet, the first member is moved to the second position against a counter force exerted by the first spring structure on the first member.

Likewise, according to an embodiment, the optical zoom device is also configured to apply an electrical current pulse to the coil of the second electropermanent magnet in order to magnetize the first magnet of the second electropermanent magnet so that a magnetization of the first magnet of the second electropermanent magnet points in the opposite direction or in the same direction as the magnetization of the second magnet of the second electropermanent magnet, or so as to demagnetize the first magnet of the second electropermanent magnet so that the magnetization of the first magnet of the second electropermanent magnet essentially vanishes, wherein when the first magnet of the second electropermanent magnet is demagnetized, the second member is moved to the intermediary position against a counter force exerted by the second spring structure on the second member, and wherein when the first magnet of the second electropermanent magnet is magnetized so that its magnetization points in the opposite direction as the magnetization of the second magnet of the second electropermanent magnet, the second member is moved to the first position in the direction of a force exerted by the second spring structure on the second member, and wherein when the first magnet of the second electropermanent magnet is magnetized so that its magnetization points in the same direction as the magnetization of the second magnet of the second electropermanent magnet, the second member is moved to the second position against a counter force exerted by the second spring structure on the second member.

Furthermore, according to an embodiment of the present invention, particularly for providing fine tuning of the respective lens assembly, the optical zoom is configured to apply a constant electrical current to the coil of the first electropermanent magnet when the first member is in the first position or in the second position or in the intermediary position so that the coil of the first electropermanent magnet generates a magnetic field that modifies the magnetic flux through the magnetic flux guiding structure of the first electropermanent magnet so that the first member (magnetic flux guiding member) is moved out of its respective position, whereby the curvature of the curvature-adjustable area of the first membrane is fine tuned.

Similarly, according to an embodiment, the optical zoom is configured to apply a constant electrical current to the coil of the second electropermanent magnet when the second member is in the first position or in the second position or in the intermediary position so that the coil of the second electropermanent magnet generates a magnetic field that modifies the magnetic flux through the magnetic flux guiding structure of the second electropermanent magnet so that the second member (magnetic flux guiding member) is moved out of its respective position, whereby the curvature of the curvature-adjustable area of the second membrane is fine tuned.

Particularly, in order to find a specific constant current that provides the respective optimal focal length, the optical zoom device is configured to sweep through an electrical current applied to the coil of the first electropermanent magnet for finding said constant electrical current applied to the coil of the first electropermanent magnet. Furthermore, in an embodiment, the optical zoom device is also configured to sweep through an electrical current applied to the coil of the second electropermanent magnet for finding said constant electrical current applied to the coil of the second electropermanent magnet.

Further, according to an embodiment of the optical zoom device according to the present invention, the optical zoom device comprises a voltage source connected to the coil of the first electropermanent magnet for applying a voltage pulse to the coil of the first electropermanent magnet so as to generate said electrical current applied to the coil of the first electropermanent magnet. Furthermore, according to an embodiment, the optical zoom device comprises a voltage source connected to the coil of the second electropermanent magnet for applying a voltage pulse to the coil of the second electropermanent magnet so as to generate said electrical current applied to the coil of the second electropermanent magnet.

Furthermore, according to an embodiment of the present invention, the voltage source is configured to adjust the magnetization of the first magnet of the first electropermanent magnet by adjusting the duration of a corresponding voltage pulse applied to the coil of the first electropermanent magnet accordingly, or by adjusting the voltage of a corresponding voltage pulse applied to the coil of the first electropermanent magnet accordingly (while keeping the pulse duration constant). Similarly, according to an embodiment, the voltage source is configured to adjust the magnetization of the first magnet of the second electropermanent magnet by adjusting the duration of a corresponding voltage pulse applied to the coil of the second electropermanent magnet accordingly, or by adjusting the voltage of a corresponding voltage pulse applied to the coil of the second electropermanent magnet accordingly (while keeping the pulse duration constant).

Furthermore, according to an embodiment, the voltage source is configured to shape the current in said coil of the first electropermanent magnet so as to achieve noise reduction of the optical zoom device, particularly by applying pulse-width modulation to the voltage applied to the coil of the first electropermanent magnet by the voltage source, and/or wherein the voltage source is configured to shape the current in said coil of the second electropermanent magnet so as to achieve noise reduction of the optical zoom device, particularly by applying pulse-width modulation to the voltage applied to the coil of the second electropermanent magnet by the voltage source.

Further, according to an embodiment of the present invention, the optical zoom device comprises an image sensor (e.g. a CMOS or CCD sensor) so that light passing along an optical path of the optical zoom device through the two lens assemblies and other corrective lenses (e.g. plastic or glass lenses) impinges on the image sensor.

Furthermore, according to an embodiment of the present invention, the optical zoom device is configured to conduct a feedback method (e.g. algorithm) that is sensing the deformation of the adjustable membrane or that is sensing the deformation of the actuator. In particular, one of the following sensing methods can be used: electromagnetic sensors such as Hall sensors or inductive sensor, electrostatic sensor such as capacitive sensing or optical sensing.

According to an embodiment, the image sensor is configured to be moved in an extension plane of the image sensor for providing optical image stabilization (OIS). Optical image stabilization means that a shift of a light beam on the image sensor due to a sudden (unwanted) movement of the optical zoom device is compensated by a corresponding movement of the image sensor (or by corresponding deflections of the light beam due to a tiltable, a tuneable prism or a laterally shifted lens, see below).

Alternatively, according to an embodiment, the optical zoom device comprises a prism that is arranged in said optical path of the optical zoom device, wherein the prism is configured to be tilted so as to deflect a light beam passing through the prism and impinging on the image sensor for providing optical image stabilization.

According to another alternative embodiment, the optical zoom device can comprise a tuneable prism that is arranged in said optical path of the optical zoom device, wherein the tuneable prism is configured to deflect a light beam passing through the prism and impinging on the image sensor for providing optical image stabilization.

According to another alternative embodiment, the optical zoom device can comprise a lens that is moveable perpendicular to the optical axis and is arranged in said optical path of the optical zoom device, wherein the moveable lens is configured to deflect a light beam passing through the moveable lens and impinging on the image sensor for providing optical image stabilization.

Furthermore, according to another embodiment, the optical zoom device comprises an actuator consisting of or comprising a spring, in particular a leaf spring, a piston, and a shape memory alloy. The shape memory alloy is connected to a frame and to the spring. When applying a current to the shape memory alloy it contracts and therefore deforms the spring. The shape memory alloy is connected to the spring such that the mechanical movement of the spring at the point where the spring is connected onto a piston is magnified compared to the movement of the spring at the position where the shape memory alloy is connected to it.

The present invention can be applied to a wide variety of different applications, particularly: Ophthalmology equipment such as phoropter, refractometer, pachymeter, ppt. biometrie, perimeter, refrakto-keratometer, refra. Lensanalyzer, tonometer, anomaloskop, kontrastometer, endothelmicroscope, anomaloscope, binoptometer, OCT, rodatest, ophthalmoscope, RTA, machine vision, mobile phone cameras, medical equipment, robot cams, virtual reality or augmented reality cameras, microscopes, telescopes, endoscopes, drone cameras, surveillance cameras, web cams, automotive cameras, motion tracking, binoculars, research, automotive, projectors, ophthalmic lenses, range finder, bar code readers etc.

In the following, further advantages, features as well as embodiments of the present invention are described with reference to the Figures, wherein.

Figure 7:
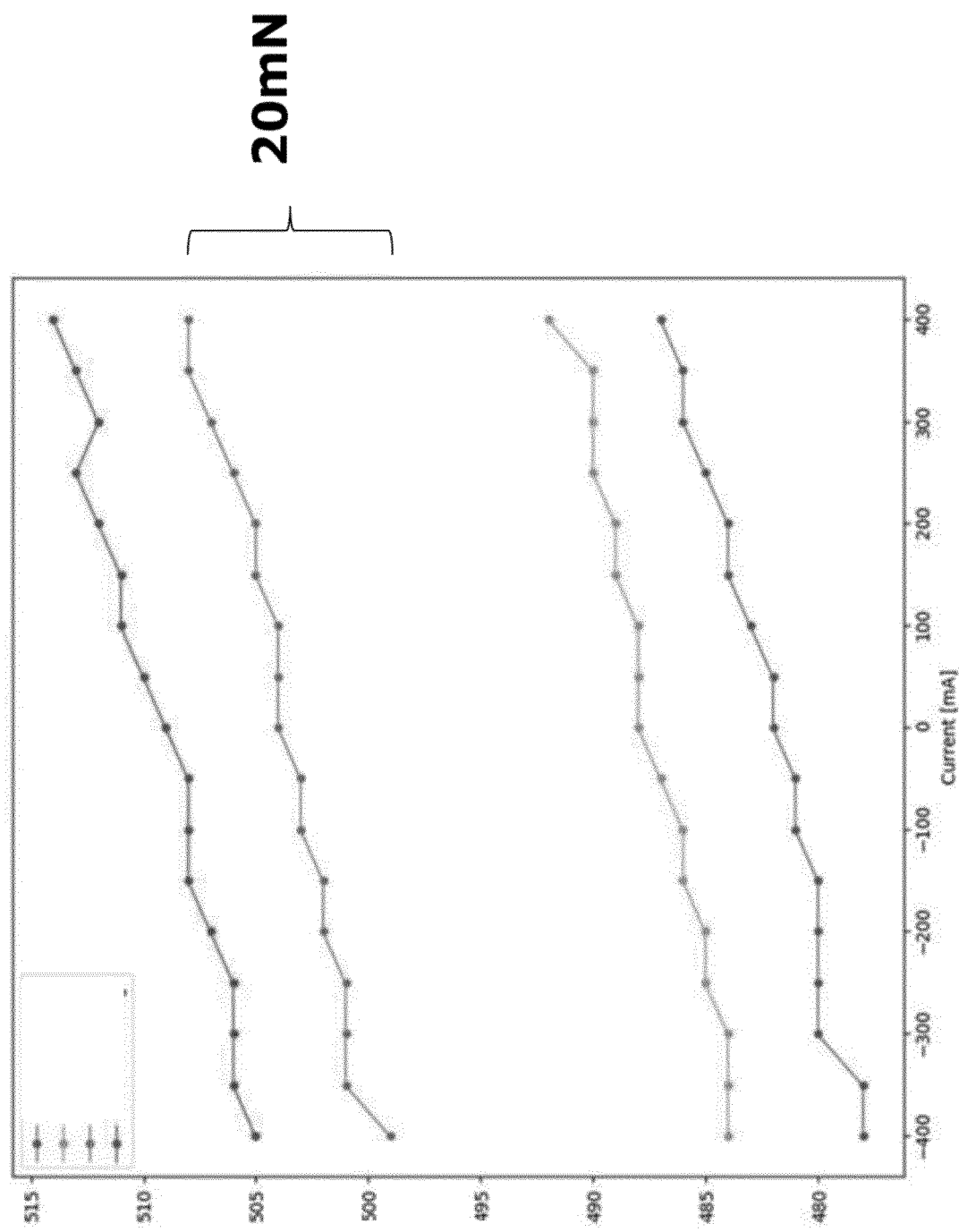
Figure 8:
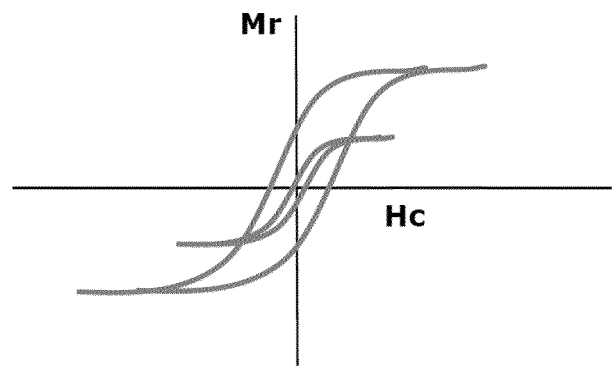
Figure 9:
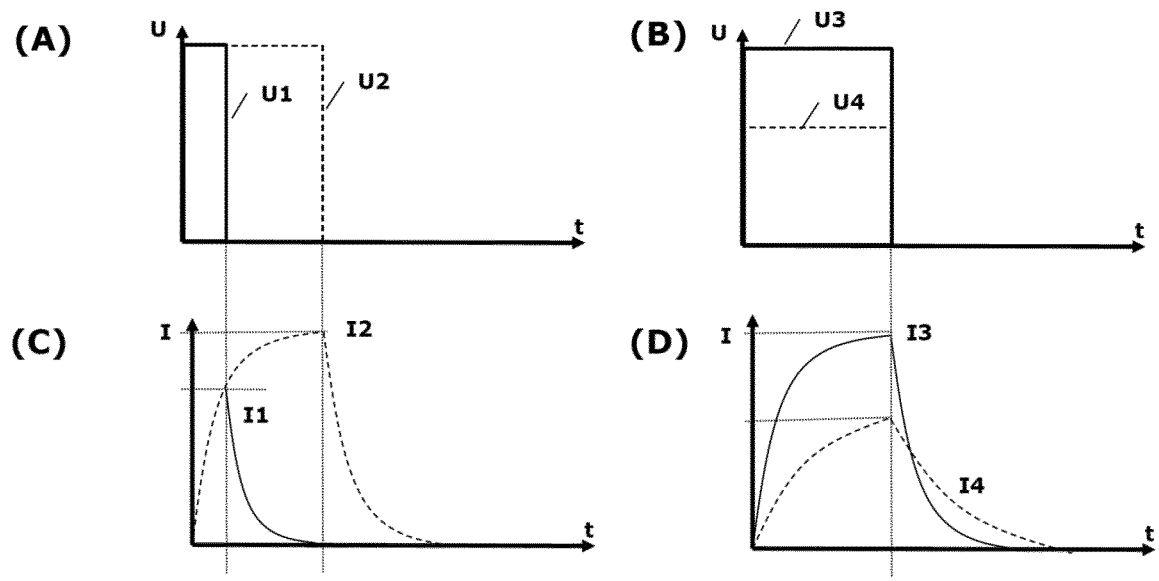
Figure 10:
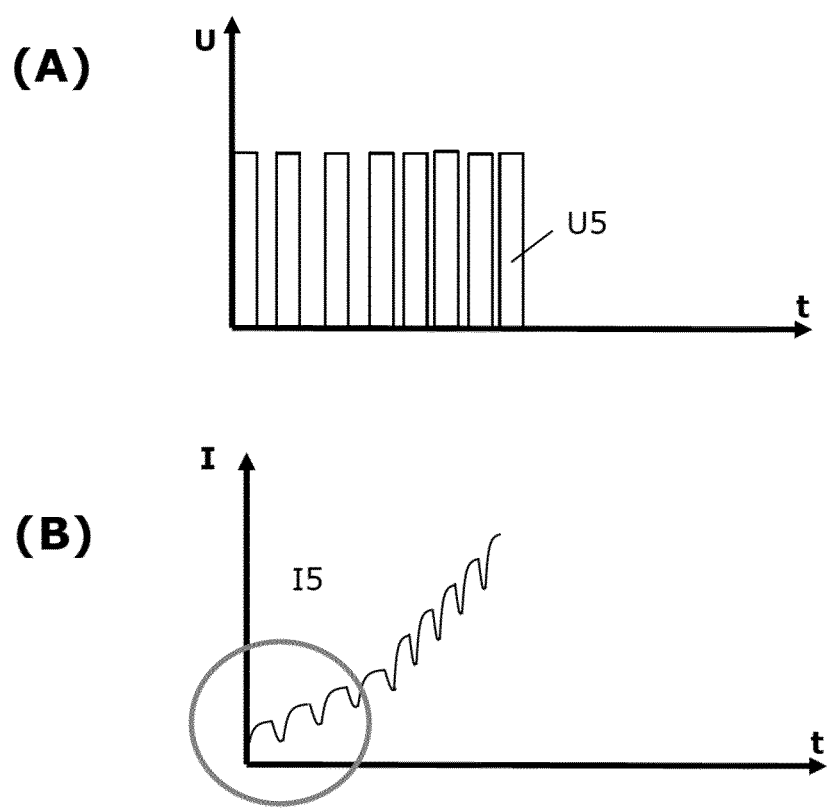
Figure 11:
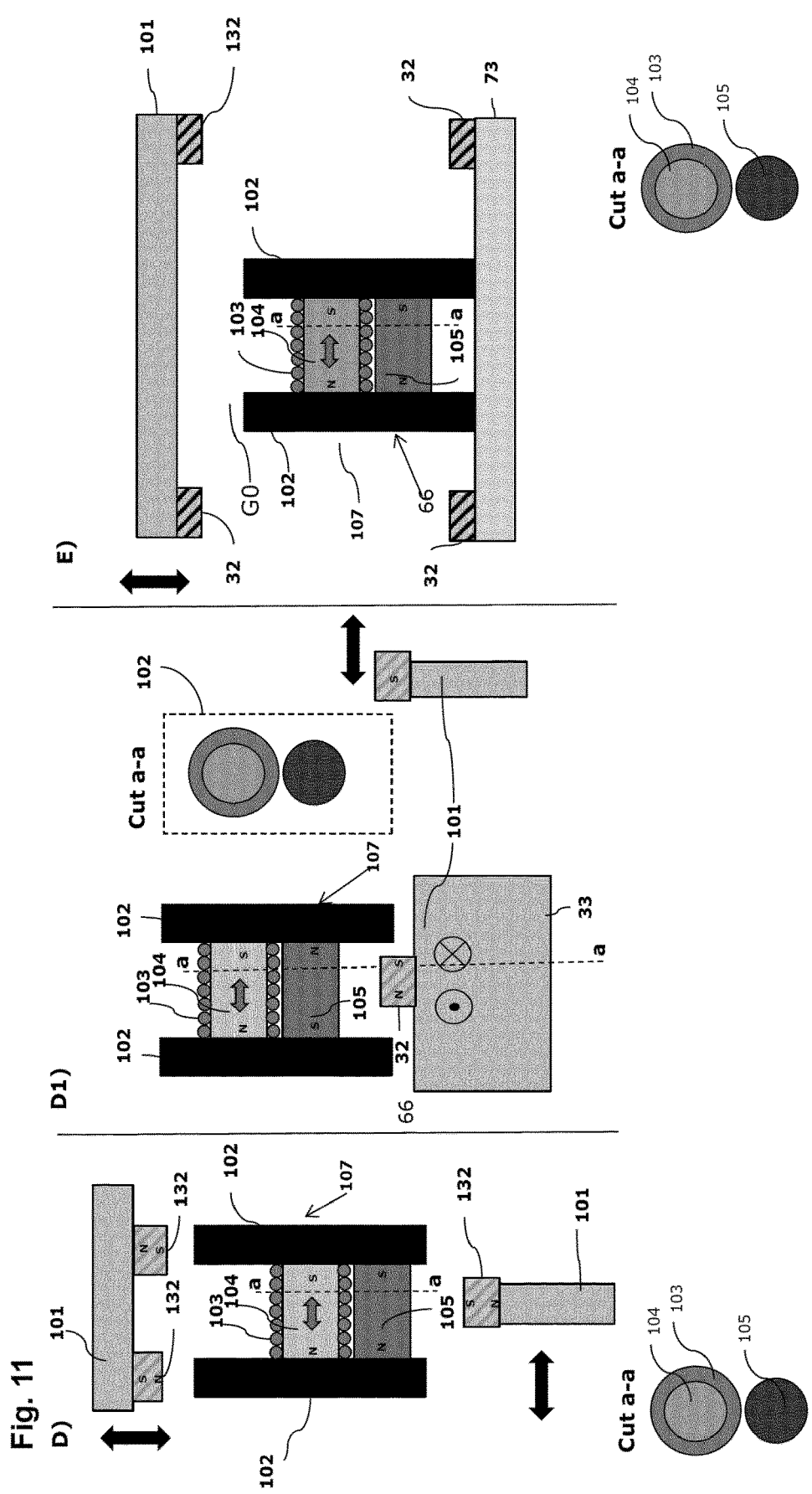
Figure 11:
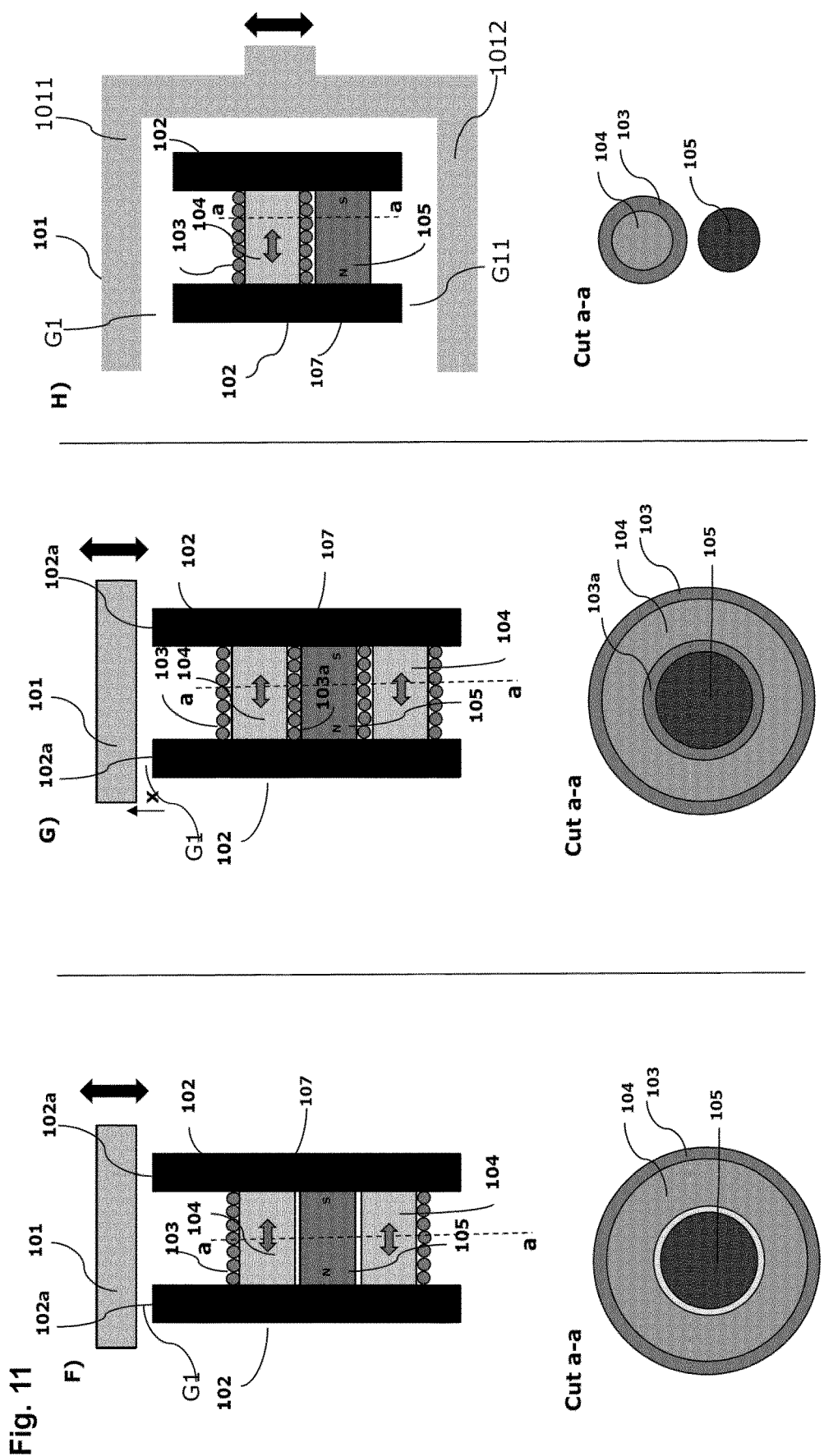
Figure 11:
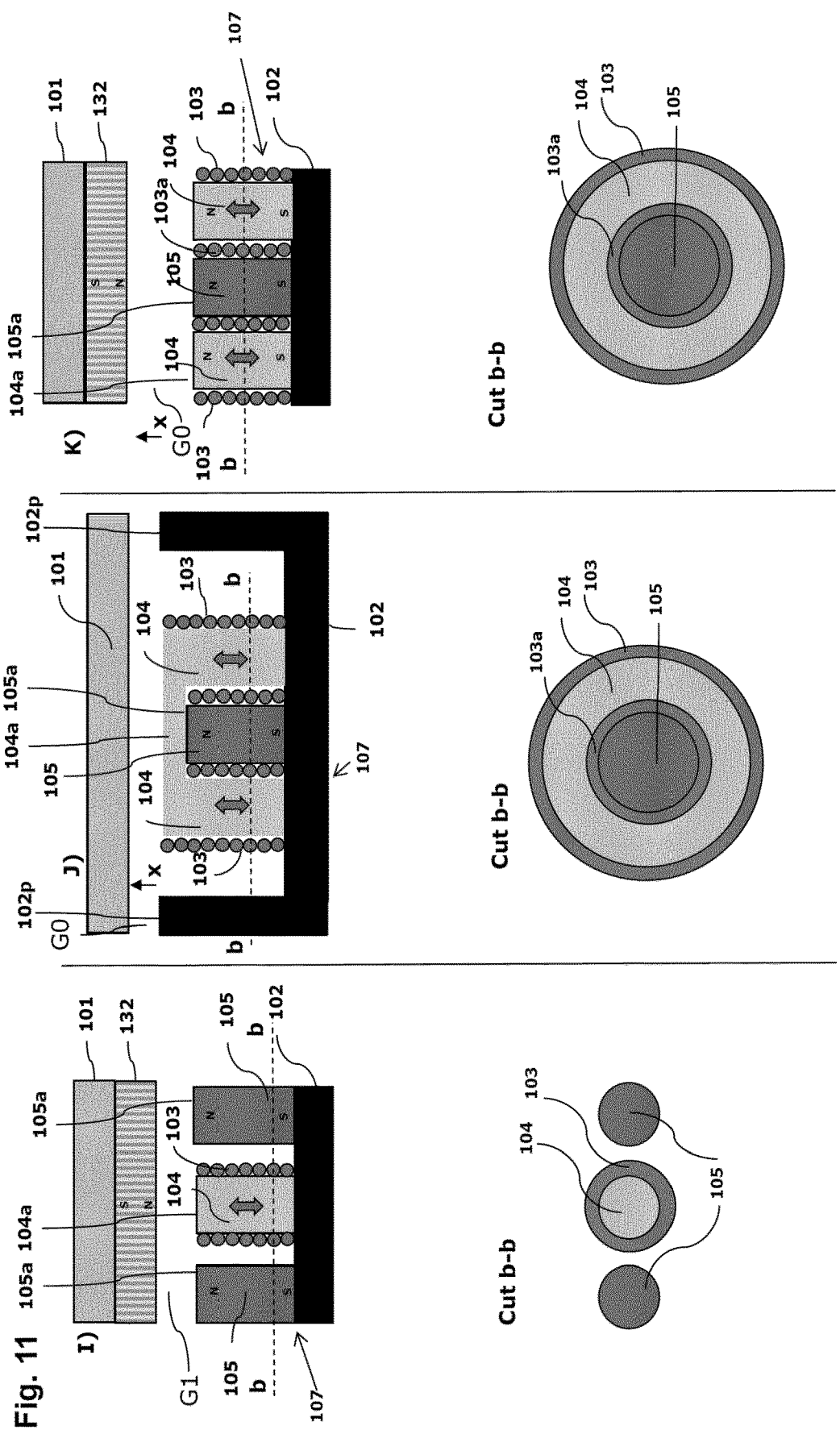
Figure 14:
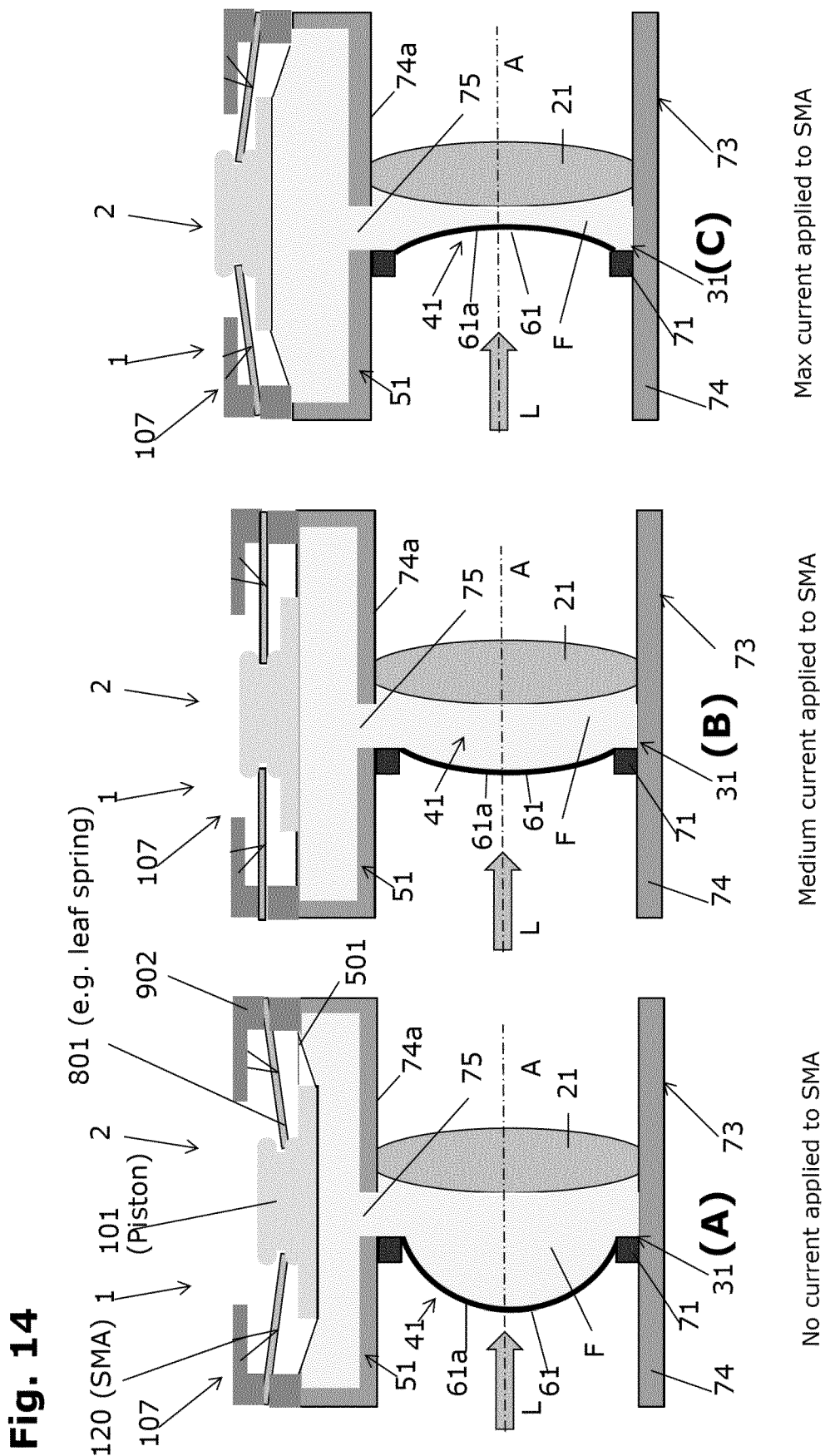
Figure 14:
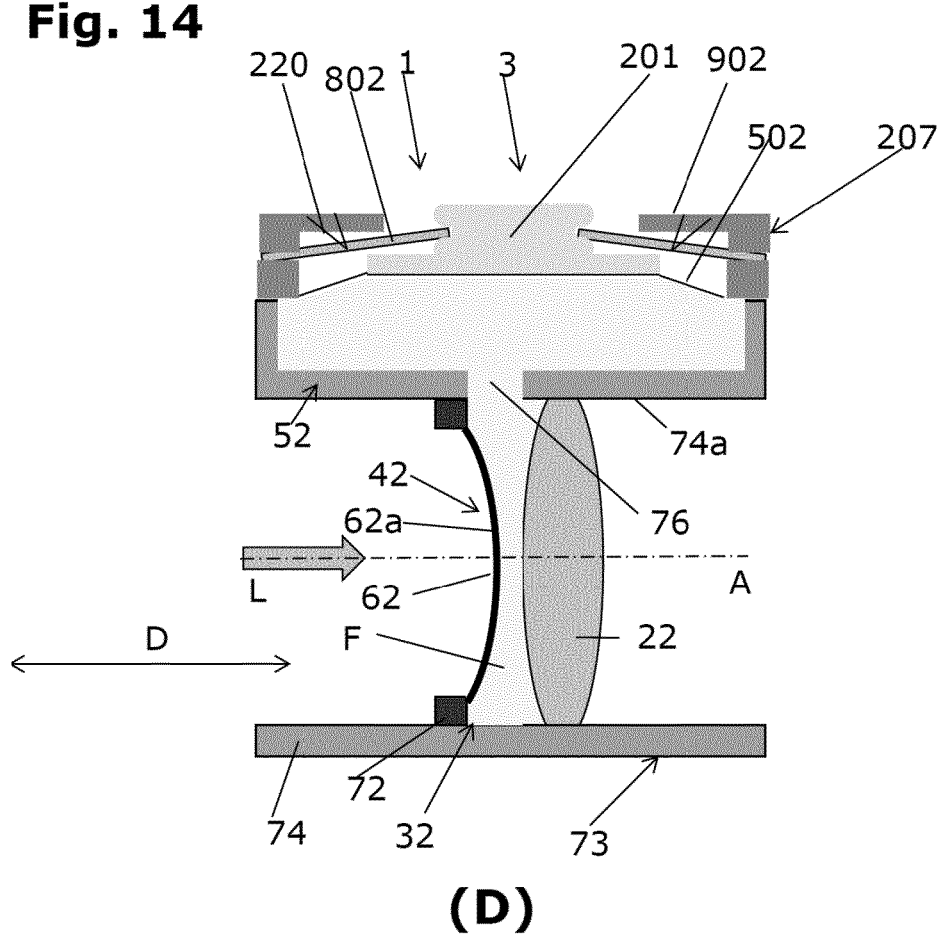
Figure 15:
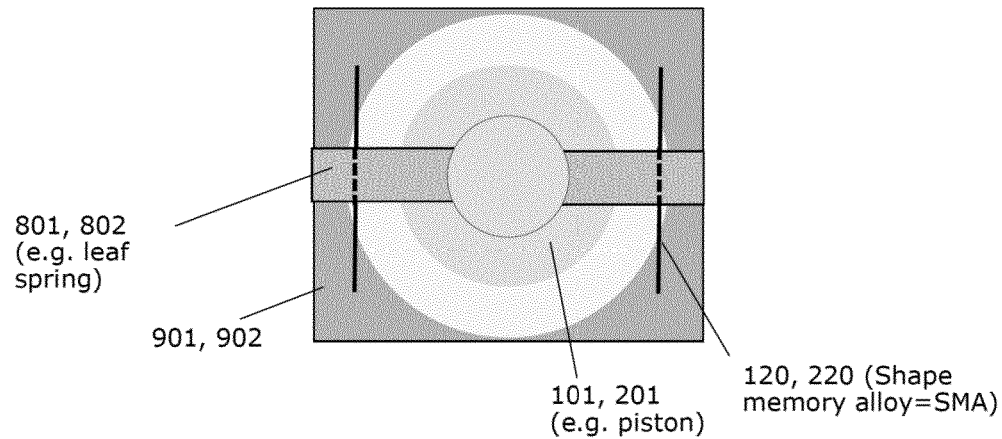

FIG. 7 shows the change in force generated by an exemplary electropermanent magnet on said member when sweeping the electrical current applied to the electropermanent magnet for four different magnetizations of the electropermanent magnet; the linear relation indicates that given a certain magnetization of the respective electropermanent magnet, a fine-tuning of the position of said magnet can be established by applying a suitable (smaller) electrical current to the respective electropermanent magnet that does not change the magnetization of the electropermanent magnet;

FIG. 8 shows the relation between a remnant magnetization Mr and coercivity Hc; particularly, the coercivity is the intensity of the applied magnetic field required to bring the magnetization of the considered material to zero after the magnetization of said material has been driven to saturation; coercivity therefore measures the resistance of a ferromagnetic material to becoming demagnetized;

FIG. 9 shows different voltage pulses and corresponding current pulses for changing a magnetization of an electropermanent magnet of an embodiment of an optical zoom device according to the present invention;

FIG. 10 shows specific voltage pulses and the corresponding current that can be used to reduce noise in an electropermanent magnet of an embodiment of an optical zoom device according to the present invention;

FIG. 11 shows different configurations (A) to M)) of electropermanent magnets that can be used in an optical device according to the invention;

FIG. 12 shows an embodiment of an optical zoom device according to the present invention comprising an optical image stabilization function (OIS); and FIG. 13 shows a perspective view of the embodiment shown in FIG. 12;

FIG. 14 shows a schematic cross-section of a first (second) lens assembly of an optical zoom device based on shape memory alloy actuator in three different states/positions (A), (B), (C), as well as a second lens assembly of the optical zoom device (D); and FIG. 15 shows a top view of a shape memory alloy based actuator used in the embodiment shown in FIG. 14 (A) to (D).

The present invention relates to optical zoom devices 1. Particularly, the optical zoom device 1 is a mechanical assembly of lens elements for which the focal length (and thus angle of view) can be varied.

According to the present invention (cf. FIGS. 1 to 5) such an optical zoom device 1 particularly comprises at least an image sensor, fix focus corrective lenses and a first and a second lens assembly 2, 3, wherein each lens assembly 2, 3 comprises a rigid optical element 21, 22 and an adjacent focus-adjustable lens 31, 32. Particularly, in then following, said rigid optical elements 21, 22 are rigid lenses 21, 22. Particularly, the lens assemblies 2, 3 comprise a fixed distance D to one another so that a complicated motorized displacement of the rigid lenses 21, 22 with respect to one another can be omitted.

Figure 1:
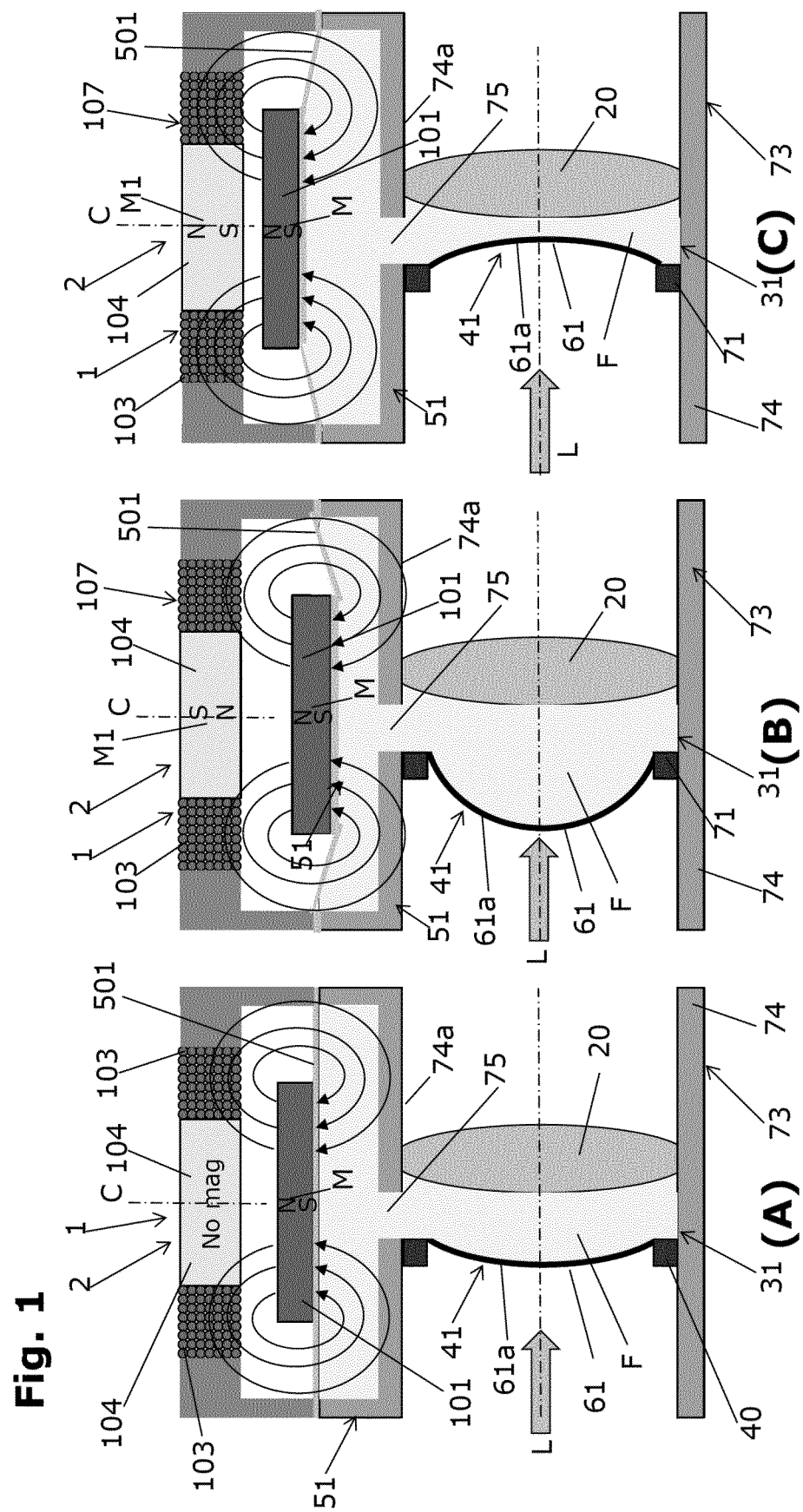
FIG. 1 shows a schematic cross-section of a first (second) lens assembly of an optical zoom device in three different states/positions (A), (B), (C)
Figure 2:
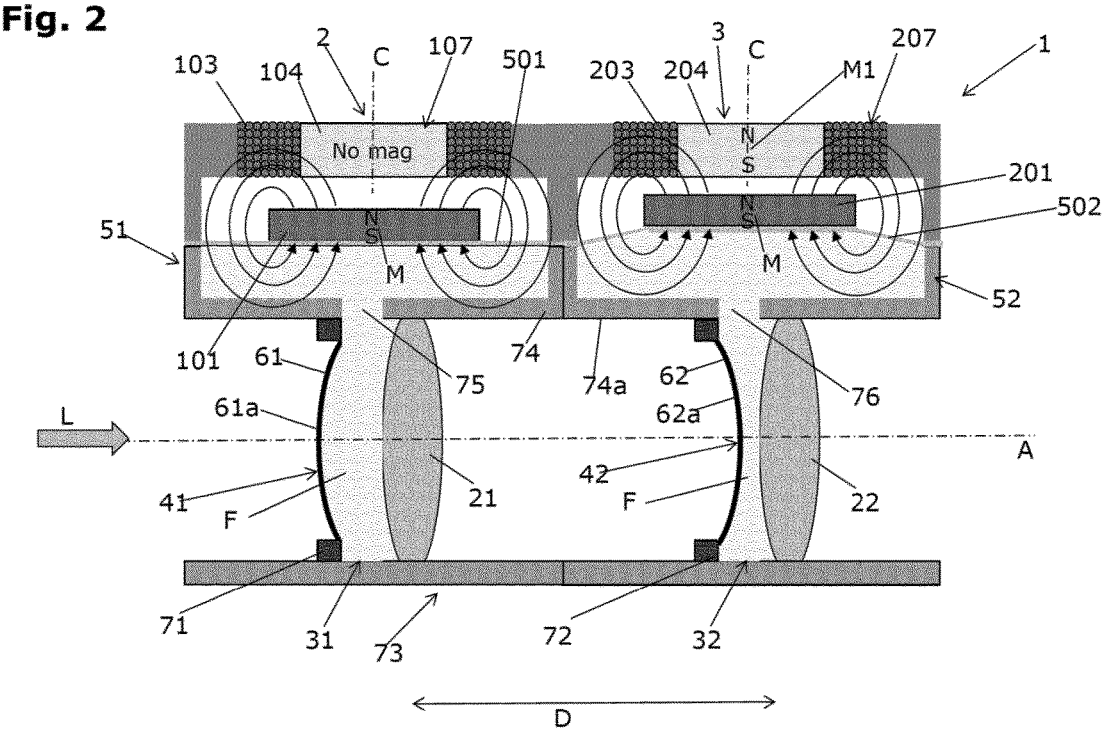
FIG. 2 shows a schematic cross-section of an embodiment of an optical zoom device according to the present invention.
Figure 3:
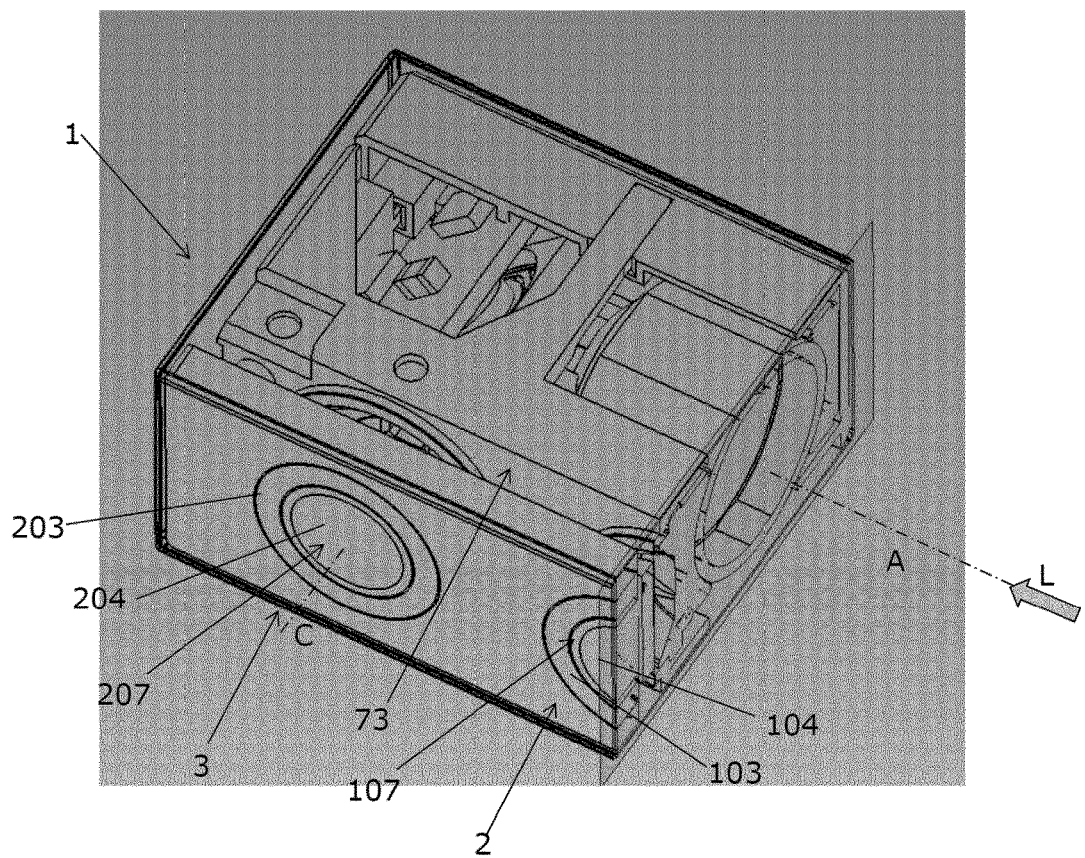
FIG. 3 shows a perspective and cross sectional view of an embodiment of an optical zoom device according to the present invention of the kind shown in FIGS. 1 and 2.

According to a first embodiment which is shown in FIGS. 1 to 3 each focus adjustable lens 31, 32 of the optical zoom device 1 is actuated by an electro permanent magnet 107, 207, wherein according to the first embodiment said electro permanent magnets 107, 207 comprise a single first magnet 104, 204 that can be magnetized in opposite directions as well as be demagnetized. The respective electro permanent magnet 107, 207 thereby interacts with a first member (101, 201) formed by a permanent magnet so that the respective electro permanent magnet can generate attractive as well as repulsive forces acting on the first member (e.g. dipole-dipole interactions).

In detail, according to FIGS. 1 and 2 this optical zoom device 1 comprises a first lens assembly 2, and a second lens assembly 3 following the first lens assembly 2 in the direction of an optical axis A of the optical zoom device 1 so that light L can pass through the first lens assembly 2 and thereafter through the second lens assembly 3 when travelling along the optical axis A and forms an image on the image sensor that can be zoomed by the device 1.

Particularly, the first lens assembly 2 comprise a first rigid lens 21 and an adjacent first focus-adjustable lens 31, wherein the first focus-adjustable lens comprises a first container 41 and a first reservoir 51, wherein the first container 41 and the first reservoir 51 are in flow connection and are filled with a transparent fluid F. The first container 41 comprises a transparent and elastically expandable first membrane 61 contacting the fluid F. For pumping the fluid F back and forth between the first container 41 and the first reservoir the first lens assembly 31 further comprises a first actuator formed by a first electropermanent magnet 107. In case more fluid F is pumped from the first reservoir 51 into the first container 41 using the first electropermanent magnet 107, the pressure in the first container 41 increases and the fluid F presses against a curvature-adjustable area 61a of the membrane 61 causing an increased convex behavior of said area 61 and a consequently a decreased focal length of the focus-adjustable lens 31.

FIG. 1 only shows the first lens assembly 31, but the second lens assembly can be designed identically. FIG. 2 shows the optical zoom device 1 having two such lens assemblies 2.

Also the second lens assembly 3 comprises a second rigid lens 22 and an adjacent second focus-adjustable lens 32, wherein the second focus-adjustable lens comprises a second container 42 and a second reservoir 52 as well. The second container 42 and the second reservoir 52 are in flow connection and are also filled with a transparent fluid F. Also here, the second container 42 comprises a transparent and elastically expandable second membrane 62 contacting the fluid F. The second lens assembly 3 further comprises a second actuator 207 formed by a second electropermanent magnet 207 for pumping fluid F from the second reservoir 52 into the second container 42 and from the second container 42 into the second reservoir 52 for adjusting a curvature of a curvature-adjustable area 62a of the second membrane 62 and therewith a focal length of the second focus-adjustable lens 32.

As indicated above, the first and the second rigid lens 21, 22 comprise a fixed constant distance D with respect to each other in the direction of the optical axis A (cf. FIG. 2). Particularly, the respective rigid lens 21, 22 can be biconvex, biconcave, flat or can be of any other shape (see also above). Furthermore, the respective rigid lens 21, 22 forms a wall of the respective container 41, 42 and faces its associated membrane 61, 62.

In order to define said curvature-adjustable areas 61a, 62a the respective membrane 61 is connected to an associated circumferential first lens shaping element 71, 72, respectively. These lens shaping elements 71, 72 are preferably formed as circular ring members 71, 72 to which the respective membrane 61, 62 is attached. The central opening of the respective lens shaping element 71, 72 is covered by the respective curvature-adjustable area 61a, 62a and can be elastically deformed/curved by the fluid F pressing against these areas 61a, 62a.

The rigid lenses 21, 22 and the adjacent focus-adjustable lenses 31, 32 are arranged in an internal space of a holder/lens barrel 73, which internal space is enclosed by a circumferential wall 74 of the holder 73, wherein the rigid lenses 21, 22 and the lens shaping elements 71, 72 are connected to an inner surface 74a of said circumferential wall 74. The circumferential wall 74 may thus also define a lateral wall of the respective container 41, 42.

As can be seen from FIG. 2, the first and the second reservoir 51, 52 are arranged laterally of the circumferential wall 74 and are each connected to the associated reservoir via an opening 75, 76 formed into the circumferential wall 74 of the holder 73.

Figure 4:
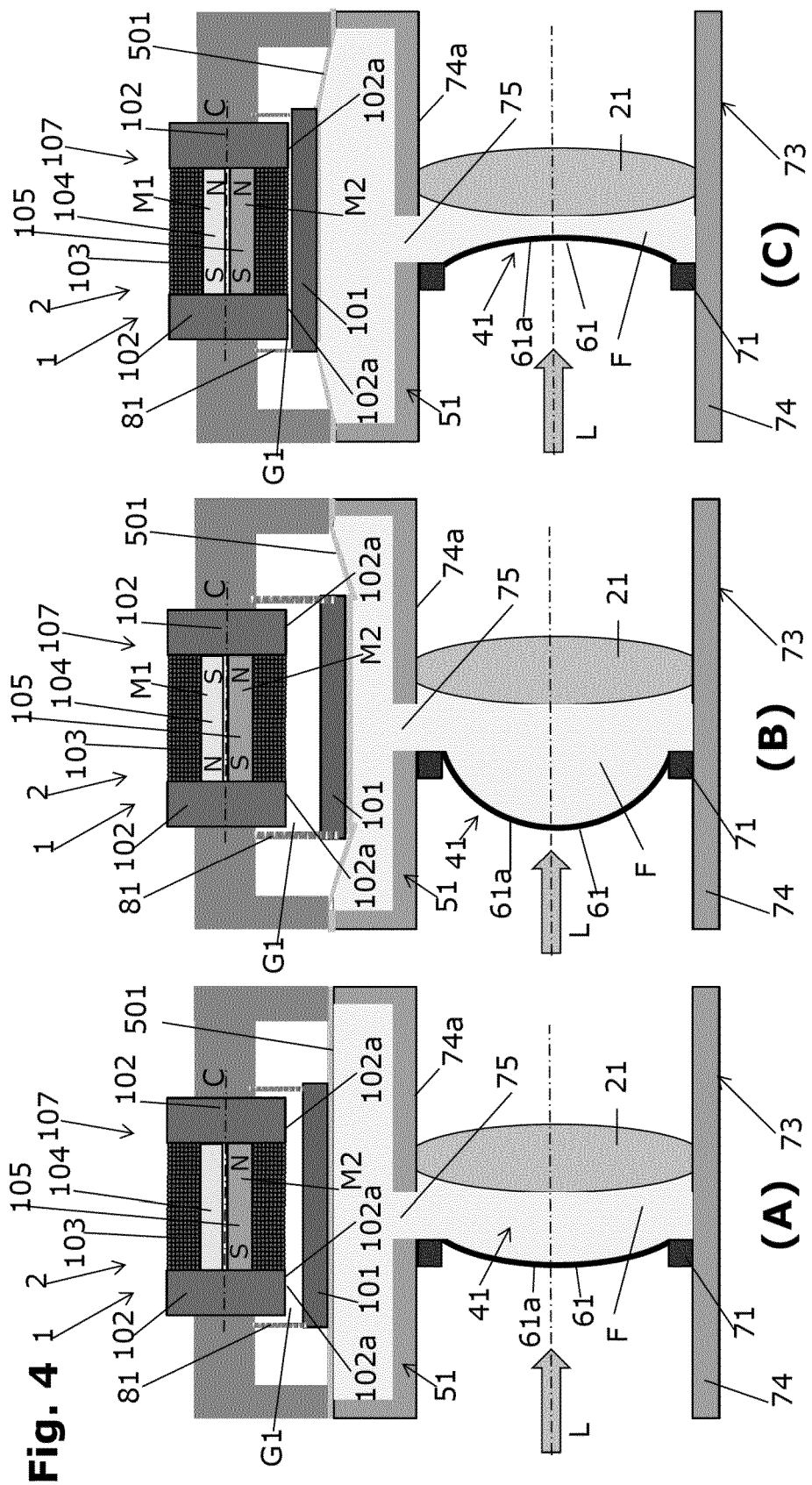
FIG. 4 shows a schematic cross-section of a first (second) lens assembly of a further embodiment of an optical zoom device according to the present invention in three different states/positions (A), (B), (C)

Furthermore, each reservoir 51, 52 comprises an elastically deformable wall 501, 502 so that when the respective wall 501, 502 is deformed the volume of the respective reservoir 51, 52 can be decreased (FIG. 2 (B) and FIG. 4 (B), fluid F is pumped into the respective container 41, 42 and the optical power of the respective lens 31, 32 increases) or increased (FIG. 2 (C) and FIG. 4 (C), fluid F is pumped into the respective reservoir 51, 52 and the optical power of the respective lens 31, 32 decreases).

Considering FIGS. 1 to 3 or FIGS. 4 to 5, the respective actuator 107, 207 is configured to act on a respective (first or second) member 101, 201 that is connected to the respective elastically deformable wall 501, 502 of the respective reservoir 51, 52, wherein the respective actuator 107, 207 is configured to move the respective member 101, 201 between a first position (FIG. 2 (B) and FIG. 4 (B) and a second position (FIG. 2 (C) and FIG. 4 (C) via an intermediary position (FIG. 2 (A) and FIG. 4 (A)), wherein when the respective member 101, 201 is moved to the first position, the respective elastically deformable wall 501, 502 is deformed and a volume of the respective reservoir 51, 52 is decreased, wherein fluid F is pumped from the respective reservoir 51 into the associated container 41, 42, and wherein when the respective member 101, 201 is moved to the second position, the elastically deformable wall 501, 502 of the respective reservoir 51, 52 is deformed and the volume of the respective reservoir 51, 52 is increased and fluid F is pumped from the respective container 41, 42 into the associated reservoir 51, 52.

The individual positions of said members 101, 202 are designed such that when the respective member 101, 201 is in the first position the respective curvature-adjustable area 61a, 62a comprises a convex curvature, and wherein when the respective member 101, 201 is in the intermediary position the curvature-adjustable area 61a, 62a comprises a larger convex radius of curvature, and wherein when the respective member 101, 201 is in the second position the respective curvature-adjustable area 61a, 62a comprises a concave curvature.

Now, according to FIGS. 1 to 3, the respective member 101, 201 is a permanent magnet and comprises a magnetization M that runs parallel to the coil axis C of the respective actuator/electropermanent magnet 107, 207, which actuators 107, 207 are mounted to the holder 73. Each actuator/electropermanent magnet 107, 207 comprises a coil 103, 203 that encloses a first magnet 104, 204 of the respective actuator 107, 207 that can be demagnetized as shown in FIG. 1 (A) such that minimal forces act on the first member 101 when no electrical current is applied to the coil 103. Correspondingly, the first member 101 and the elastically compressible wall 501 are in said intermediary position. By applying a sufficiently high current the first magnet 104 can be magnetized so that the magnetizations M, M1 of the first member 101 and of the first magnet 104 are opposite and the first member 101 is therefore pushed away from the first magnet 104. Consequently, the first member 101 and the elastically deformable wall 501 are in the first position as shown in FIG. 1 (B). Furthermore, using an appropriate current pulse applied to the coil 103 the magnetization M1 of the first magnet 104 can also be oriented such that both magnetizations M1, M point and the same direction and the first member 101 is attracted by the first magnet 104. Consequently, the first member 101 and the elastically deformable wall 501 are in the second position as shown in FIG. 1 (C).

Thus, current pulses of sufficient magnitude can be used to achieve a course adjustment of the focal length of the system 1. Particularly, both lens assemblies 2 and 3 can in this way be tuned in a course manner to achieve a certain zoom of an image generated by the optical zoom device 1. Such current pulses can have a typical magnitude of about 5 A and a duration of several microseconds.

Additionally, a fine tuning of the focal length can be established as follows. When the respective member 101, 201 is in one of the above described positions, a smaller current (e.g. in the range from −500 mA to 500 mA) can be applied to the respective coil 103, 203 such that the magnetization M1 of the respective first magnet 104, 204 does not change. However, the current flowing through the respective coil 103, 203 interacts with the magnetic field generated by the member 101, 201 and a Lorentz force is generated. This Lorentz force allows adjusting the position of the respective member 101, 201 around the previously adjusted position and therewith a corresponding fine tuning of the curvature of the respective curvature-adjustable area 61a, 62a.

Figure 5:
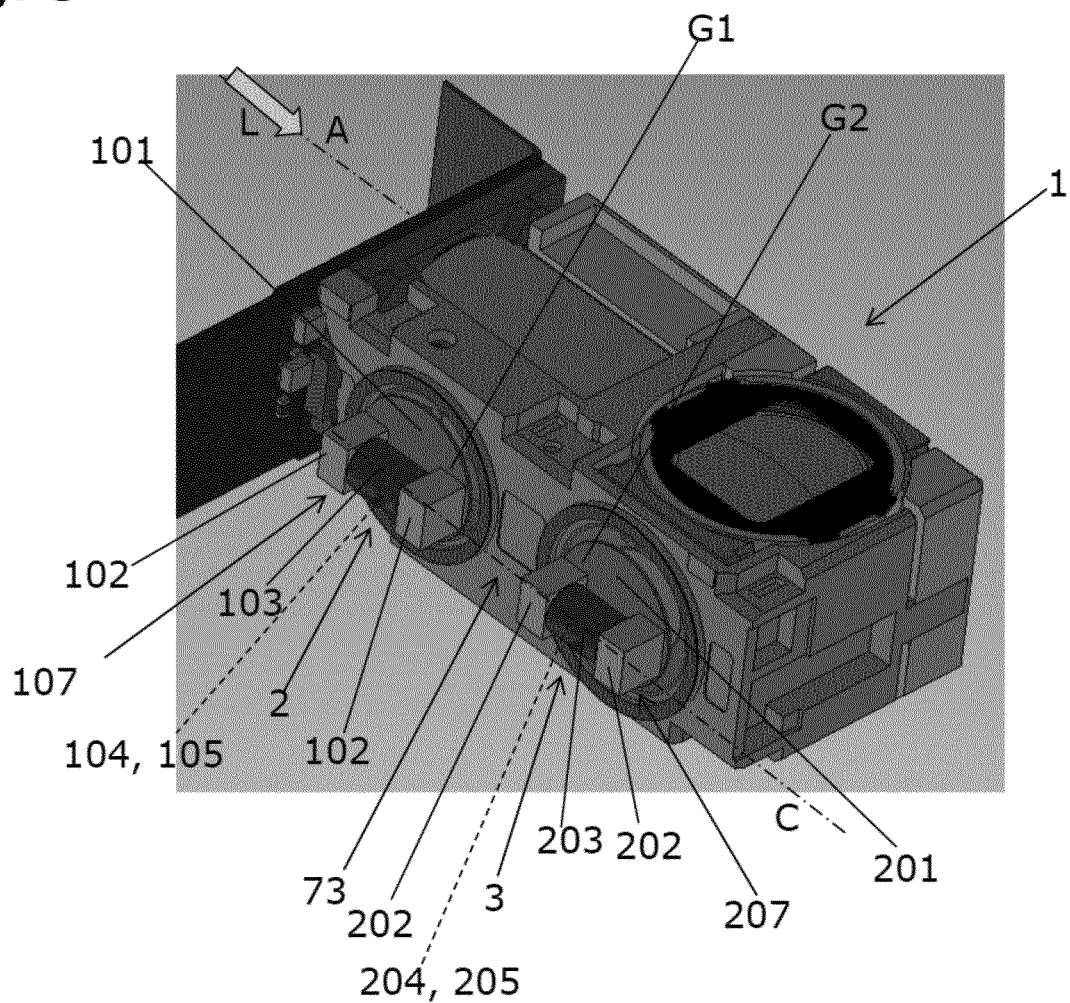
FIG. 5 shows a perspective view of an embodiment of an optical zoom device according to the present invention of the kind shown in FIG. 4.

Furthermore, FIGS. 4 and 5 show an alternative embodiment of a first lens assembly 2 (also here the second lens assembly 3 can be designed like the first lens assembly 2, cf. FIG. 2).

Here, besides said first magnet 104, 204, the respective actuator/electro-permanent magnet 107, 207 also comprises a second magnet 105, 205 having a higher coercivity than the first magnet 104, 204. These two magnets 104, 105 or 204, 205 are enclosed by the respective coil 103, 203 as shown in FIGS. 4 (A) to (C). The coercivities are chosen such that the magnetization M1 of the respective first magnet can be changed by applying a current pulse to the respective coil 103, 203, while the respective second magnets 105, 205 magnetization remains unchanged.

Furthermore, in contrast to FIGS. 1 to 3, the respective member 101, 201 is now a magnetic flux guiding member but does not comprise a permanent magnetic field. Since the respective electropermanent magnet 107, 207 now merely generates attractive reluctance forces, the respective member 101, 201 is coupled to the respective electropermanent magnet by means of a spring structure 81, 82. This spring structure can be a leaf spring, a wound spring or any other spring.

Particularly, as shown in FIG. 4 (A) to (C) and FIG. 5, the coil axis C of the respective coil 103, 203 of the respective electropermanent magnet 107, 207 extends parallel to the respective member 101, 201 and/or parallel to the optical axis A of the optical zoom device 1. In order to generate defined reluctance forces, the respective electropermanent magnet 107, 207 comprises a magnetic flux guiding structure 102, 202 that preferably comprises two spaced apart elements 102, 202 between which the respective first and second magnets 104, 105 or 204, 205 are arranged, such that the respective first and the second magnets 104, 105 or 204, 205 contact both elements 102, 202 of the respective magnetic flux guiding structure 102, 202 or are connected in a magnetic flux guiding manner to both elements 102, 202. Furthermore, each element 102, 202 comprises a face side 102a, 202a facing the respective member 101, 201 which face sides 102a, 202a form a gap G1, G2 with the respective member 101, 202. Particularly said two elements 102, 202 face each other in the direction of the coil axis C of the respective coil 103, 203 of the respective electropermanent magnet 107, 207.

Also here, for coarse tuning—as shown in FIGS. 4 (A) to (B) for the first lens assembly—the optical zoom device 1 is configured to apply an electrical current pulse to the coil 103 of the first electropermanent magnet 107 in order to magnetize the first magnet 104 of the first electropermanent magnet 107 so that a magnetization M1 of the first magnet 104 of the first electropermanent magnet 107 points in the opposite direction or in the same direction as the magnetization M2 of the second magnet 105 of the first electropermanent magnet 107, or so as to demagnetize the first magnet 104 of the first electropermanent magnet 107 so that the magnetization M1 of the first magnet 104 of the first electropermanent magnet 107 essentially vanishes.

When the first magnet 104 of the first electropermanent magnet 107 is demagnetized by applying an appropriate current pulse to the first coil 103 as shown in FIG. 4(A), the first member 101 is moved to the intermediary position against a counter force exerted by the first spring structure 81 on the first member 101. Here, due to the remaining magnetization M2 of the second magnet 105 there is still a reluctance force (due to a circular magnetic flux via the gap G1) that is balanced by the first spring structure 81 that tends to push the first member 101 away from the first electropermanent magnet 107.

Further, when the first magnet 104 of the first electropermanent magnet 107 is magnetized by a current pulse applied to the coil 103 so that its magnetization M1 points in the opposite direction as the magnetization M2 of the second magnet 105, the first member 101 is moved to the first position in the direction of a force exerted by the first spring structure 81 on the first member 101. Here, the magnetic flux does not run via the gap G1 since the two magnets 104,105 are magnetized in opposite direction. Consequently, the first spring structure 81 presses the first member 101 away from the electropermanent magnet 107 into the first position.

Furthermore, when the first magnet 104 of the first electropermanent magnet 107 is magnetized by a corresponding current pulse so that its magnetization M1 points in the same direction as the magnetization M2 of the second magnet 105 of the first electropermanent magnet 107, the first member 101 is moved to the second position against a counter force exerted by the first spring structure 81 on the first member 101 due to a stronger reluctance force (magnetic flux now runs via gap G1 through the first member and tends to minimize gap G1).

Again, also here a fine tuning of the focal length can be accomplished by applying a smaller current (see above) to the coil 103 that does not change the magnetization M1 of the first magnet 104. The resulting modified magnetic flux allows to move the first member around its coarse-tuned position (i.e. first, second or intermediary position)

Besides the electropermanent magnets 107, 207 described above also other configurations can be used in the above described embodiments relating to FIGS. 1 to 5.

Particularly, FIGS. 11 A) to M) show different configurations of such alternative electropermanent magnets 107, 207. Note, that in the following only the first electropermanent magnet 107 is depicted. The second electropermanent magnet 207 can be formed identically. Further in FIGS. 12 A) to M) the first member 101 is connected to the elastically deformable wall 501 of the first reservoir 51, while the first (second) electropermanent magnet 107 (207) is connected to the holder 73.

According to FIG. 11 A) the electropermanent magnet 107 comprises a magnetic flux guiding structure 102 connected to the magnets 104, 105 which magnetic flux guiding structure 102 forms the respective gap G1 with the first member 101 of the elastically deformable wall 501 of the first reservoir 51. Here, particularly, the magnetic flux guiding structure comprises two magnetic flux guiding elements 102 spaced apart from one another between which said first magnet 104 and said second magnet 105 are arranged, such that each magnet 104, 105 contacts both elements 102, wherein each element 102 comprises a face side 102a facing the first member 101, which face sides 102a form the gap G1 with the first member 101. Particularly, merely the first magnet 104 is enclosed by the coil 103, wherein the coercivity of the first magnet 104 is smaller than the coercivity of the second magnet 105.

The working principle of the electropermanent magnet 107 shown in FIGS. 11 A) to L) can be easily explained using FIG. 11 A). In case the second magnetization M2 of the second magnet 105 points to the right, switching the magnetization M1 of the first magnet 104 also to the right, as shown in FIG. 11 A) produces a magnetic flux that is guided via element 102 on the right hand side and magnetic flux guiding member (first member) 101 back to the other element 102 (on the left hand side) of the magnetic flux guiding structure. This generates a reluctance force that tries to minimize gap G1.

Switching the magnetization M1 of the first magnet 104 such that the magnetizations M1, M2 are antiparallel closes the magnetic flux inside the structure 102 so that the reluctance force vanishes.

The switching of the first magnetization M1 can be achieved by applying a current pulse to the coil 103 surrounding the first magnet 104. Advantageously, energy is only required for changing the direction of the magnetization M1 of the first magnet 104 but not for maintaining it in the switched direction. Thus, the actuators 107 described herein can be driven by means by a series of current pulses which saves a considerably amount of energy.

Particularly, both magnets 104, 105 are arranged such that their magnetization M1, M2 is either parallel or antiparallel and extends essentially along the extension plane of the first member 101. Alternatively, cf. FIG. 11 D) lower part, the first member 101 may also extend perpendicular to said magnetizations for generating a tilting movement in the directions indicated by the double arrow. This can also lead to a compression or expansion of the first reservoir 51.

As shown in FIG. 11 B), the coil 103 may also surround the second magnet 105. Furthermore, FIG. 11 B) also shows the embodiment according to which a part of coil 103 or a separate coil is wound around a portion of a magnetic flux guiding element 102.

Further, the second magnet 105 may be enclosed by a separate further coil 103a (cf. FIG. 11 C).

Further, as shown in FIG. 11 D) at least one additional permanent magnet 132 may be attached to the first member 101. If the first member 101 with the magnets 132 is not very close, magnetic forces (dipol-dipol interaction) dominate.

If the magnet 132 is very close (e.g. smaller than 1 mm) to the electropermanent magnet 107, turning the electropermanent magnet 107 on generates a dipol-dipol interaction, in case the electropermanent magnet 107 is off, a reluctance force towards element 102 is generated.

The dipol-dipol interaction/force can be repulsive or attractive depending on the polarization of the magnets 132 and the electropermanent magnet 107. The force direction depends on the field gradient.

In case the at least one magnet 132 is located between the two elements/plates 102, mainly a mechanical moment will act on magnet(s) 132 and member 101, respectively (not shown). Using dipol-dipol interaction or/and reluctance forces combined with a mechanical spring, stable stopping points of the member 101 can be created.

An additional advantage can be the reduction of the noise due to absence of the force impulse on the member 101 during switching of the electropermanent magnet.

In addition, as shown in FIG. 11 E) such permanent magnets 132 may also be attached to a non-magnetic support (e.g. holder) 73 of the electropermanent magnet 107 so as to interact repulsively with permanent magnets 132 arranged on said member 101.

Said one or several permanent magnets 132 may also be used to enforce a moment of the member 101.

According to FIGS. 11 F) and 11 G) the first magnet 104 may also extend circumferentially around the second magnet 105, wherein a single coil 103 may surround both magnets (FIG. 11 F)), or wherein an additional coil 103a may enclose the inner second magnet 105 such that the outer coil 103 also encloses the further coil 103a (cf. FIG. 11 G)).

Further, according to FIG. 11 H) the electropermanent magnet 107 can be arranged between a first and a second member 1011, 1012 of the magnetic flux guiding member 101 so that the electropermanent magnet 107 forms two gaps G1 and G11, namely with member 1011 and 1012. Thus, the first member 101 can be attracted to the electropermanent magnet 107 from both sides depending on which member 1011, 1012 is closer to the electropermanent magnet 107 when the latter is turned on. Thus, two touching or two stable points can be reached.

Further, as shown in FIG. 11 I) the electropermanent magnet 107 may comprise a further second magnet 105, wherein the first magnet 104 is arranged between the two second magnets 105, and wherein the first and the two second magnets 104, 105 are arranged with a bottom side on a single magnetic flux guiding structure/plate 102. Here, the first and the two second magnets 104, 105 each comprise a top side 104a, 105a, which top sides form the gap G1 with a permanent magnet 132 that is attached to the first member 101, which can be a magnetic flux guiding region 101 but may also be non-magnetic.

Here, particularly, the hard second magnets (large coercivity) 105 are magnetized in the opposite direction compared to permanent magnet 132 (cf. FIG. 11 I)).

Further, as shown in FIG. 11 J), the first magnet 104 surrounds the second magnet 105, wherein the first and the second magnet 104, 105 are arranged with a bottom side on a magnetic flux guiding structure 102 that comprises lateral portions 102p between which said first and second magnet 104, 105 are arranged, wherein the first and the second magnet 104, 105 each comprise an opposing top side 104a, 105a, wherein the top side 104f of the first magnet 104 covers the top side 105a of the second magnet 105. Particularly, said lateral portions 102p form the gap G1 with said first member 101 (magnetic flux guiding member).

Further, in FIG. 11 K), the first magnet 104 does not cover the top side 105a of the second magnet. Here, the two magnets 104, 105 are merely arranged on a single magnetic flux guiding structure/plate 102 with their bottom sides while the tops sides 104a, 105a of the first 104 and the second magnet 105 form the gap G1 with a permanent magnet 132 attached to the first member 101 (which can be a magnetic flux guiding region 101 but may also be non-magnetic). Particularly, the permanent magnet 132 and second magnet 105 are mounted such that they generate a repulsive force.

Finally, FIG. 30L) shows a configuration without a separate magnetic flux guiding structure 102. Here, the first magnet 104 again surrounds the second magnet 105, wherein the first and the second magnet 804, 805 each comprise a top side 104a, 105a and an opposing bottom side 104b, 105b, wherein the top side 804a of the first magnet 104 covers the top side 105a of the second magnet 105 and wherein the bottom side 104b of the first magnet 104 covers the bottom side 105b of the second magnet 805 such that the second magnet 105 is completely enclosed by the first magnet 104, wherein the top side 104a of the first magnet 104 forms a gap G1 with a first part 1011 of the first member 101 (e.g. magnetic flux guiding member) while the bottom side 104b of the first magnet 104 forms a further gap G11 with a second part 1012 of the first member 101. Also here, the member 101 can be attracted to the electropermanent magnet 107 from both sides depending on which part 1011, 1012 is closer to the electropermanent magnet 107 when the latter is turned on. Thus, again, two touching or two stable points can be reached.

Particularly, in FIGS. 11 A) to 11 L) the magnetization of the second magnets 105 points upwards or downwards. The magnetization M1 of the first magnet 104 can be switched by means of the voltage source and coil 103 and particularly further coil 103a to be either parallel or antiparallel to the fixed magnetization M2 of the second magnet(s) 105.

Additionally, coil 103a can be used to create a second electromagnetic field to fine tune the total resulting field. Furthermore this coil can be used for sensing purposes, and it can help to reduce the noise by keeping the magnetic flux during the switching in the electropermanent magnet 107 (no high force pulse on 101).

Further, particularly the magnetic flux guiding member 101 can be formed out of a soft magnet/magnetic flux guiding material such as steel, spring steel, cobalt-iron soft magnetic alloys, e.g. permendur, hyperco.

Further, according to FIG. 11 M) the second magnet 105 can be a ring magnet 105, wherein here the first magnet 104 is enclosed by the coil 103 and is arranged on a bottom of a magnetic field guiding structure 102 that comprises a circumferential wall 102p that encloses said coil 103. Further, a central opening of the ring magnet 105 is filled with a magnetic flux guiding element 102m below which the first magnet 104 is arranged. The coil 103 is arranged below the ring magnet 105.

Figure 6:
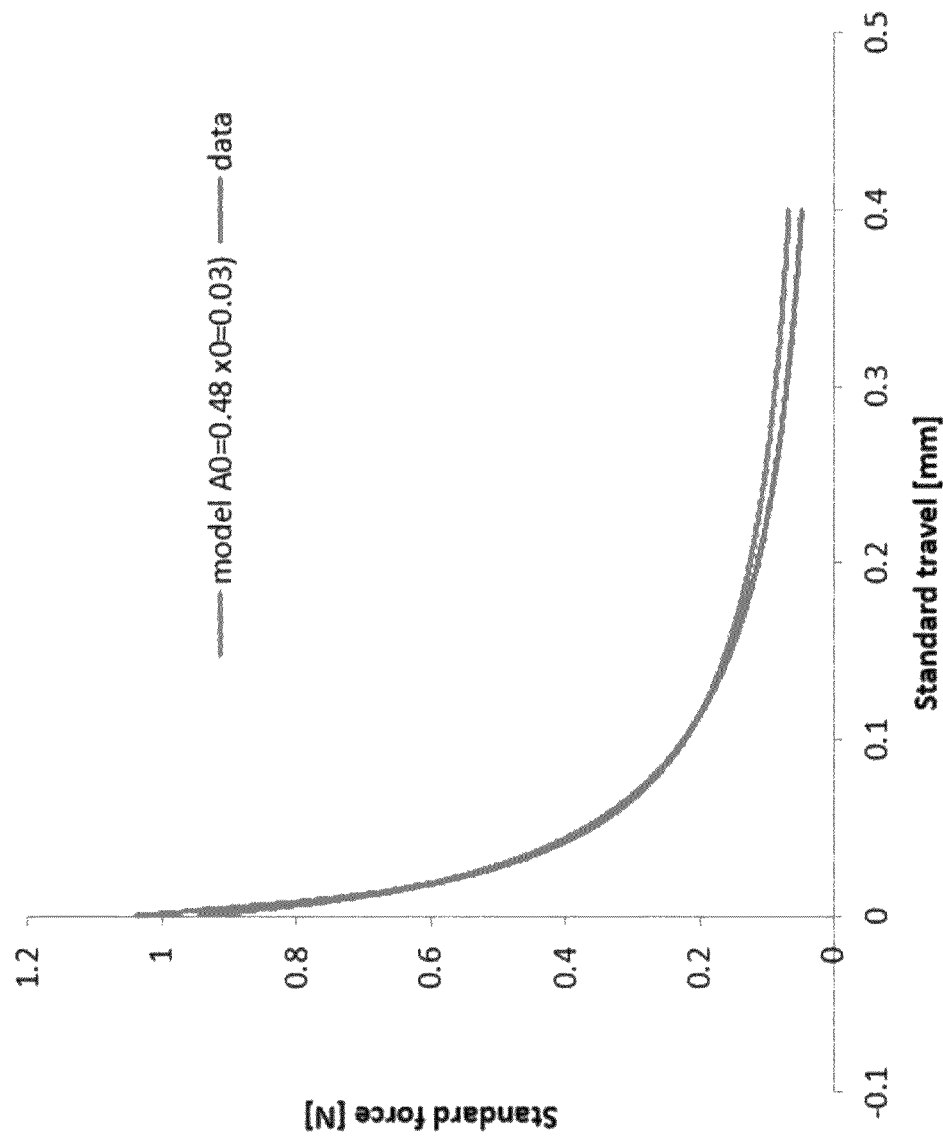
FIG. 6 shows the force versus distance between an electropermanent magnet (actuator) of an optical zoom device according to the present invention and a member interacting with the electropermanent magnet, wherein the functional relationship between said force and said distance indicates that the electropermanent magnet can be used to displace said member in a controlled and effective manner.

The herein described electropermanent magnets 107, 207 are well-suited for actuating the focus-adjustable lenses 31, 32 as can be seen from the force distance relation shown in FIG. 6.

Furthermore, the linear relationship between current applied to the respective coil 103, 203 and resultant force shown in FIG. 7 indicates that the electropermanent magnets 107, 207 are particularly suitable for fine-tuning the positions of the respective member 101, 102.

As indicated in FIG. 8 such a fine-tuning is possible because a sufficiently small current can be applied to the respective coil 103, 203 such that the magnetization M1 of the first magnets 104, 204 is not changed, but allows fine-tuning of the position of the first and second member 101, 201 due to the corresponding magnetic field generated by the respective coil 103, 203.

As further shown in FIG. 9 the magnetization of the first magnets 104, 204 can be controlled by increasing the pulse duration of the applied voltage pulse (FIGS. 9 (A) and (C)) or by increasing the magnitude of the applied voltage pulse while keeping the pulse duration constant (FIGS. 9 (B) and (D).

Furthermore, noise reduction can be achieved by using pulse width modulation (PWM) or low pass filtering of the applied voltage as shown in FIGS. 10 (A) and (B).

Furthermore, all embodiments of the optical device 1 according to the present invention can comprise an optical image stabilization function.

Here, the optical zoom device 1 comprises an image sensor I so that light L passing along an optical path of the optical zoom device 1 through the two lens assemblies 2, 3 impinges on the image sensor I to create an image.

Particularly, the image sensor I can be configured to be moved in an extension plane of the image sensor I for providing optical image stabilization. Such a movement of the image sensor I can be used to compensate an unwanted shift of the image when the optical zoom device 1 undergoes a sudden unwanted movement.

Particularly, as shown in FIGS. 12 and 13, the optical zoom device 1 can comprise a prism 301 that is arranged in said optical path of the optical zoom device 1, wherein the prism 301 is configured to be tilted so as to deflect a light beam L passing through the prism 304 and impinging on the image sensor (I) for providing optical image stabilization.

For tilting the prism 301, the latter can be mounted to a gimbal 302 to which a magnet 302 is attached. The magnet 303 and therewith the gimbal 302 and the prism 304 can be tilted about two independent axes by means of a Lorentz force generated by means of coils 305 integrated into a substrate 304 (e.g. kidney coils embedded in printed circuit board). A Hall sensor 306 can be used to detect the position of the magnet 303. A corresponding signal of the Hall sensor 306 is indicative of the position of the magnet 302 and can be used as a feedback signal for controlling the tilting of the prism 301.

Alternatively a tuneable prism can be used. The tuneable prism consists of a fluid which is enclosed by two flat optical windows. By tilting the two windows with respect to each other, the angle between the two windows is changed and therefore a tuneable prism is generated. This is then shifting the light going through the tuneable prism and therefore acting as optical image stabilizing element.

Alternatively, the optical zoom device can comprise a lens, that is moveable perpendicular to the optical axis A. The moveable lens is configured to deflect a light beam passing through the moveable lens and impinging on the image sensor for providing optical image stabilization.

FIG. 14 (A)-(D) shows in conjunction with FIG. 15 an alternative embodiment of an optical zoom device 1 according to the present invention.

FIG. 14 (A) to (D) shows the first lens assembly 2 of the device 1 in three different states, namely with the first member 101 arranged in a first position (FIG. 14(A)), in an intermediary position (FIG. 14(B)), and in a second position (FIG. 14(C)).

FIG. 14 (D) shows the second lens assembly 3 that can be designed analogous to the first lens assembly 2 as described above. Here, only the second position of the second member 201 is shown.

FIG. 15 shows a top view onto the first/second member 101, 202 of the optical zoom devise shown in FIG. 14.

Particularly, the optical zoom device 1 according to FIGS. 14 and 15 can be configured as described above, wherein in contrast to the embodiments described above, the first and second member 101, 202 are now particularly formed as pistons and do not interact with an electropermanent magnet. Instead, the respective member 101, 202 is moved by an associated shape memory alloy 120, 220 and an associated spring 81, 82, wherein the respective spring 81, 82 can be a leaf spring that connects the respective member 101, 201 to the holder 73, e.g. via an associated frame 901, 902. Further, the respective shape memory alloy 120, 220 connects the respective spring 81, 82 to the respective frame 901, 902

Now, the optical zoom device 1 is configured to by apply an electrical current through the respective shape memory alloy 120, 220 so as to move the respective piston/member 101, 201 into the respective position shown in FIGS. 14 (A) to (C), which in turn controls the deformation of the curvature-adjustable area 61a, 62a of the respective focus-adjustable lens 31, 32.

In the non-actuated position, the respective leaf spring 81, 82 is formed such that the respective piston 101, 201 is at its lowest (first) position, pushing the lens 31, 32 to its most convex position. When the current is increased, the respective shape memory alloy 120, 220 contracts and therefore bends the respective leaf spring 81, 82 upwards. The respective piston 101, 201 which is connected to the respective leaf spring 81, 82 is therefore pushed upwards and the lens becomes flat or even concave (FIG. 14(B) intermediary position, FIG. 14(C) second position).

The invention claimed is:

1. Optical zoom device, comprising:
a first lens assembly,
a second lens assembly following the first lens assembly in the direction of an optical axis of the optical zoom device so that light can pass through the first lens assembly and thereafter through the second lens assembly when travelling along the optical axis, characterized in that
the first lens assembly comprise a first rigid optical element and an adjacent first focus-adjustable lens, wherein the first focus-adjustable lens comprises a first container and a first reservoir, wherein the first container and the first reservoir are in flow connection and are filled with a transparent fluid,
wherein the first container comprises a transparent and elastically expandable first membrane contacting the fluid, and wherein the first lens assembly further comprises a first actuator for pumping fluid from the first reservoir into the first container and from the first container into the first reservoir for adjusting a curvature of the first membrane and therewith a focal length of the first focus-adjustable lens, and wherein the first actuator comprises a first electropermanent magnet, and
wherein the second lens assembly comprise a second rigid optical element and an adjacent second focus-adjustable lens, wherein the second focus-adjustable lens comprises a second container and a second reservoir, wherein the second container and the second reservoir are in flow connection and are filled with a transparent fluid, wherein the second container comprises a transparent and elastically expandable second membrane contacting the fluid, and wherein the second lens assembly further comprises a second actuator for pumping fluid from the second reservoir into the second container and from the second container into the second reservoir for adjusting a curvature of the second membrane and therewith a focal length of the second focus-adjustable lens, and wherein the second actuator comprises a second electropermanent magnet.

2. Optical zoom device according to claim 1, characterized in that the first and the second rigid optical element comprise a fixed constant distance with respect to each other in the direction of the optical axis.

3. Optical zoom device according to claim 1, characterized in that the first rigid optical element forms a wall of the first container and faces the first membrane, and/or wherein the second rigid optical element forms a wall of the second container and faces the second membrane.

4. Optical zoom device according to claim 1, characterized in that the first membrane is connected to a circumferential first lens shaping element for defining a curvature-adjustable area of the first membrane, wherein the curvature-adjustable area of the first membrane comprises said curvature to be adjusted, and/or wherein the second membrane is connected to a circumferential second lens shaping element for defining a curvature-adjustable area of the second membrane, wherein the curvature-adjustable area of the second membrane comprises said curvature to be adjusted.

5. Optical zoom device according to claim 4, characterized in that the optical zoom device comprises a holder having circumferential wall comprising an inner surface, wherein the first lens shaping element and the first rigid optical element are connected to the inner surface, and/or
wherein the second lens shaping element and the second rigid optical element are connected to the inner surface, and the first and/or the second reservoir are arranged laterally of the circumferential wall.

6. Optical zoom device according to claim 5, characterized in that the flow connection between the first reservoir and the first container comprises a first opening of said circumferential wall of the holder, and/or
wherein the flow connection between the second reservoir and the second container comprises a second opening of said circumferential wall of the holder.

7. Optical zoom device according to claim 1, characterized in that the first reservoir comprises an elastically deformable wall, and/or
wherein the second reservoir comprises an elastically deformable wall.

8. Optical zoom device according to claim 1, characterized in that the optical zoom device comprises an image sensor so that light passing along an optical path of the optical zoom device through the two lens assemblies impinges on the image sensor.

9. Optical zoom device according to claim 8, characterized in that the image sensor is configured to be moved in an extension plane of the image sensor for providing optical image stabilization.

10. Optical zoom device according to claim 8, characterized in that the optical zoom device comprises a prism that is arranged in said optical path of the optical zoom device, wherein the prism is configured to be tilted so as to deflect a light beam passing through the prism and impinging on the image sensor for providing optical image stabilization.

11. Optical zoom device according to claim 8, characterized in that the optical zoom device comprises a tuneable prism that is arranged in said optical path of the optical zoom, wherein the tuneable prism is configured to deflect a light beam passing through the prism and impinging on the image sensor for providing optical image stabilization.

12. Optical zoom device according to claim 8, characterized in that the optical zoom device comprises a laterally moveable optical lens that is arranged in said optical path of the optical zoom device, wherein the laterally moveable optical lens is moved perpendicular to the optical axis and therefore deflects a light beam passing through the laterally moveable optical lens and impinging on the image sensor for providing optical image stabilization.

13. Optical zoom device, comprising:
a first lens assembly,
a second lens assembly following the first lens assembly in the direction of an optical axis of the optical zoom device so that light can pass through the first lens assembly and thereafter through the second lens assembly when travelling along the optical axis, characterized in that
the first lens assembly comprise a first rigid optical element and an adjacent first focus-adjustable lens,
wherein the first focus-adjustable lens comprises a first container and a first reservoir,
wherein the first container and the first reservoir are in flow connection and are filled with a transparent fluid, wherein the first container comprises a transparent and elastically expandable first membrane contacting the fluid, and
wherein the first lens assembly further comprises a first actuator for pumping fluid from the first reservoir into the first container and from the first container into the first reservoir for adjusting a curvature of the first membrane and therewith a focal length of the first focus-adjustable lens, and wherein the first actuator comprises at least a first spring and at least a first shape memory alloy, and/or
wherein the second lens assembly comprise a second rigid optical element and an adjacent second focus-adjustable lens, wherein the second focus-adjustable lens comprises a second container and a second reservoir, wherein the second container and the second reservoir are in flow connection and are filled with a transparent fluid,
wherein the second container comprises a transparent and elastically expandable second membrane contacting the fluid, and wherein the second lens assembly further comprises a second actuator for pumping fluid from the second reservoir into the second container and from the second container into the second reservoir for adjusting a curvature of the second membrane and therewith a focal length of the second focus-adjustable lens, and wherein the second actuator comprises at least a second spring and at least a second shape memory alloy.

14. Optical zoom device according to claim 13, characterized in that the first and the second rigid optical element comprise a fixed constant distance with respect to each other in the direction of the optical axis.

15. Optical zoom device according to claim 13, characterized in that the first rigid optical element forms a wall of the first container and faces the first membrane, and/or wherein the second rigid optical element forms a wall of the second container and faces the second membrane.

16. Optical zoom device according to claim 13, characterized in that the first membrane is connected to a circumferential first lens shaping element for defining a curvature-adjustable area of the first membrane (61), wherein the curvature-adjustable area of the first membrane comprises said curvature to be adjusted, and/or wherein the second membrane is connected to a circumferential second lens shaping element for defining a curvature-adjustable area of the second membrane, wherein the curvature-adjustable area of the second membrane comprises said curvature to be adjusted.

17. Optical zoom device according to claim 16, characterized in that the optical zoom device comprises a holder having circumferential wall comprising an inner surface, wherein the first lens shaping element and the first rigid optical element are connected to the inner surface, and/or wherein the second lens shaping element and the second rigid optical element are connected to the inner surface, and the first and/or the second reservoir are arranged laterally of the circumferential wall.

18. Optical zoom device according to claim 13, characterized in that the first reservoir comprises an elastically deformable wall, and/or wherein the second reservoir comprises an elastically deformable wall.

19. Optical zoom device according to claim 16, characterized in that the first actuator is configured to act on a first member that is connected to the elastically deformable wall of the first reservoir, wherein the first actuator is configured to move the first member between a first and a second position via an intermediary position, wherein when the first member is moved to the first position, the elastically deformable wall of the first reservoir is deformed and a volume of the first reservoir is decreased, wherein fluid is pumped from the first reservoir into the first container, and wherein when the first member is moved to the second position the elastically deformable wall of the first reservoir is deformed and the volume of the first reservoir is increased and fluid is pumped from the first container into the first reservoir, wherein when the first member is in the first position the curvature-adjustable area of the first membrane comprises a first radius of curvature, wherein when the first member is in the intermediary position the curvature-adjustable area of the first membrane comprises a second radius of curvature that is larger than said first radius of curvature associated to the first position of the first member, and wherein when the first member is in the second position the curvature-adjustable area of the first membrane comprises a third radius of curvature, and/or wherein the second actuator is configured to act on a second member that is connected to the elastically deformable wall of the second reservoir, wherein the second actuator is configured to move the second member between a first and a second position via an intermediary position, wherein when the second member is moved to the first position, the elastically deformable wall of the second reservoir is deformed and a volume of the second reservoir is decreased, wherein fluid is pumped from the second reservoir into the second container, and wherein when the second member is moved to the second position, the elastically deformable wall of the second reservoir is deformed and the volume of the second reservoir is increased and fluid is pumped from the second container into the second reservoir, wherein when the second member is in the first position the curvature-adjustable area of the second membrane comprises a first radius of curvature, wherein when the second member is in the intermediary position, the curvature-adjustable area of the second membrane comprises a second radius of curvature that is larger than said first radius of curvature associated to the first position of the second member, and wherein when the second member is in the second position, the curvature-adjustable area of the second membrane comprises a third radius of curvature and the first shape memory alloy is connected to the first spring at a first point and the first spring is connected to the first member at a second point, wherein particularly the first point is moving at least 2 times, in particular at least 5 times as much as the second point when the first actuator is actuated, and/or wherein the second shape memory alloy is connected to the second spring at a first point and the second spring is connected to the second member at a second point, wherein particularly the first point is moving at least 2 times, in particular at least 5 times as much as the second point when the second actuator is actuated.

20. Optical zoom device according to claim 13, characterized in that the optical zoom device is configured to sense a deformation of the first shape memory alloy by measuring the resistance of the first shape memory alloy, and/or wherein the optical zoom device is configured to sense a deformation of the second shape memory alloy by measuring the resistance of the second shape memory alloy.

* * * * *